(12) United States Patent
Stewart et al.

(10) Patent No.: US 8,041,087 B2
(45) Date of Patent: Oct. 18, 2011

(54) RADIOGRAPHIC IMAGING DISPLAY APPARATUS AND METHOD

(75) Inventors: Thomas L. Stewart, Peoria, IL (US); Deepak K. Gaddipati, Peoria, IL (US)

(73) Assignee: Bradley University, Peoria, IL (US)

( * ) Notice: Subject to any disclaimer, the term of this patent is extended or adjusted under 35 U.S.C. 154(b) by 1902 days.

(21) Appl. No.: 11/099,406

(22) Filed: Apr. 5, 2005

(65) Prior Publication Data

US 2006/0239523 A1    Oct. 26, 2006

(51) Int. Cl.
*A61B 5/05* (2006.01)
*G06K 9/00* (2006.01)
*G06F 17/00* (2006.01)

(52) U.S. Cl. .......................... 382/128; 600/407; 345/418

(58) Field of Classification Search .................. 382/128, 382/131; 345/650, 661, 156; 250/353.01
See application file for complete search history.

(56) References Cited

U.S. PATENT DOCUMENTS

| 5,138,671 | A | * | 8/1992 | Yokoyama | 382/172 |
| 5,734,739 | A | * | 3/1998 | Sheehan et al. | 382/128 |
| 5,970,164 | A | * | 10/1999 | Bamberger et al. | 382/128 |
| 6,310,477 | B1 | | 10/2001 | Schneider | 324/307 |
| 6,799,066 | B2 | | 9/2004 | Steines et al. | 600/407 |
| 7,333,644 | B2 | | 2/2008 | Jerebko et al. | |
| 2002/0009215 | A1 | * | 1/2002 | Armato et al. | 382/131 |
| 2003/0223627 | A1 | * | 12/2003 | Yoshida et al. | 382/128 |
| 2004/0258286 | A1 | * | 12/2004 | Salla et al. | 382/128 |
| 2006/0197780 | A1 | * | 9/2006 | Watkins et al. | 345/620 |
| 2009/0003671 | A1 | | 1/2009 | Inoue et al. | |
| 2009/0010508 | A1 | | 1/2009 | Inoue et al. | |

OTHER PUBLICATIONS

International Preliminary Examination Report, PCT/US06,10370 (Jan. 13, 2009).
International Search Report for PCT/US2006/010370.

* cited by examiner

*Primary Examiner* — Long V. Le
*Assistant Examiner* — Helene Bor
(74) *Attorney, Agent, or Firm* — Robert C. Haldiman; Husch Blackwell LLP

(57) ABSTRACT

The present invention is an anatomy display method for radiographically obtained data. The anatomy display method comprises obtaining an anatomy dataset comprised of pixels, each of the pixels having a luminance, and the pixels being arranged in slices. A portion of the anatomy dataset is selected. A representative slice of the portion of the anatomy dataset is used to establish a threshold pixel luminance within the entire selected portion of the anatomical dataset. All pixels in the selected portion of the anatomy dataset below the threshold are set to zero luminance. A selected organ in the selected portion is isolated by volumetric analysis. A volumetric matrix of the pixels corresponding to the selected organ is saved. The matrix may be further manipulated for examination by rotating it, tracking it, rendering it transparent and enlarging subvolumes.

4 Claims, 24 Drawing Sheets

RADIOGRAPHIC IMAGING DISPLAY APPARATUS AND METHOD

CROSS-REFERENCE TO RELATED APPLICATIONS

None

BACKGROUND OF THE INVENTION

1. Field of the Invention

This invention is in the field of medical imaging, and in particular the display of images generated from digitized data sets obtained with computerized axial tomography (CAT scanning), magnetic resonance imaging (MRI scanning), positron emission tomography (PET scanning) and ultrasound scanning.

2. Related Art

Digitized radiographic imaging is well known. CAT scanning, PET scanning, MRI scanning and in some cases ultrasound scanning all produce data sets comprised of pixels or voxels. The pixels each correspond to a designated location within the tissues being studied. Typically, the pixels are arranged in a Cartesian fashion in rows and columns and each set of rows and columns is a two dimensional slice image of the corresponding tissue within the patient being studied. A typical radiographic study may include on the order of one to four hundred slices. Each pixel also has a number assigned to it that corresponds to the responsiveness of the tissue at the location corresponding to that pixel to the radiographic modalities being used, as for example, luminance in response to an x-ray beam for CAT scanning. Most typically, each pixel is assigned a byte, and correspondingly has 256 possible luminance values.

Conventional display of images generated from such data sets are two dimensional displays of each slice. Displays are usually black, gray and white. Radiologists are then presented with a series of two dimensional images with varying shades of gray corresponding to anatomical organs, for example showing bone as black, muscle as an intermediate shade of gray and cartilage as a lighter shade of gray.

The visibility of lesions and disease processes is in such displays is variable. Diagnosis is heavily dependent upon the clinical acumen of the radiologist or clinician. Ambiguous results are often reported. Moreover, in order to appreciate lesion or disease processes in any three dimensional or volumetric sense, the clinician must view multiple slices in separate images. Image manipulation techniques currently available are often inadequate to remove obscuring features, leaving the diseased tissue or lesion occult. Current imaging techniques do not produce representations of lesions that are useful to surgeons for planning surgery. They often do not produce representations of disease processes that are useful to internists in diagnosis, selection of treatment modalities or monitoring of the progress of medical treatment. For example, two areas of particular interest wherein the prior art is inadequate include cartilage tears to be imaged for review by orthopedic surgeons and arterial plaque being treated by internists or cardiologists.

Existing imaging techniques often rely on approximation or interpolation approaches. For example, U.S. Pat. No. 6,799,066 B2 to Steines et al. uses a particular three dimensional Euclidian distance transformation to generate a contour of the surface of an organ. Others use B-spline techniques for fitting a curve to selected locations in a dataset in order to regenerate an approximated organ contour. These and other prior art techniques fail to generate a volumetric matrix of a diseased organ on which may be displayed in a useful manner for appreciating the nature and scope of a lesion or disease process. They also fail to adequately isolate the entire complex of the organ of interest and its lesion or disease process, while also actively reproducing the lesion of disease process itself. They also fail to eliminate obscuring features of the dataset. There is a need in the art for these capabilities.

There is a need in the art for a more precise and less approximate approach to displaying images based upon known digital radiographic data sets. There is a further need for isolating the organ in question from obscuring anatomy. There is a further need for generation of a volumetric matrix of the organ in question and the lesion or disease process in question. There is a further need for display of a particular organ in a manner that is useful to a treating clinician. As always, there is a continuing need for techniques responsive to manipulation and selections by an examining clinician. There is a continuing need for economy and speed. Also there is a continuing need for systems that reproduce diagnostic images in a manner that is useful and convenient for the clinicians using them.

SUMMARY OF THE INVENTION

The present invention is an anatomy display method for radiographically obtained data. The anatomy display method comprises obtaining an anatomy dataset comprised of pixels, each of the pixels having a luminance, and the pixels being arranged in slices. A portion of the anatomy dataset is selected. A representative slice of the portion of the anatomy dataset is used to establish a threshold pixel luminance within the entire selected portion of the anatomical dataset. All pixels in the selected portion of the anatomy dataset below the threshold are set to zero luminance. A selected organ in the selected portion is isolated by volumetric analysis. A volumetric matrix of the pixels corresponding to the selected organ is saved. The matrix may be further manipulated for examination by rotating it, tracking it, rendering it transparent and enlarging subvolumes.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 23:
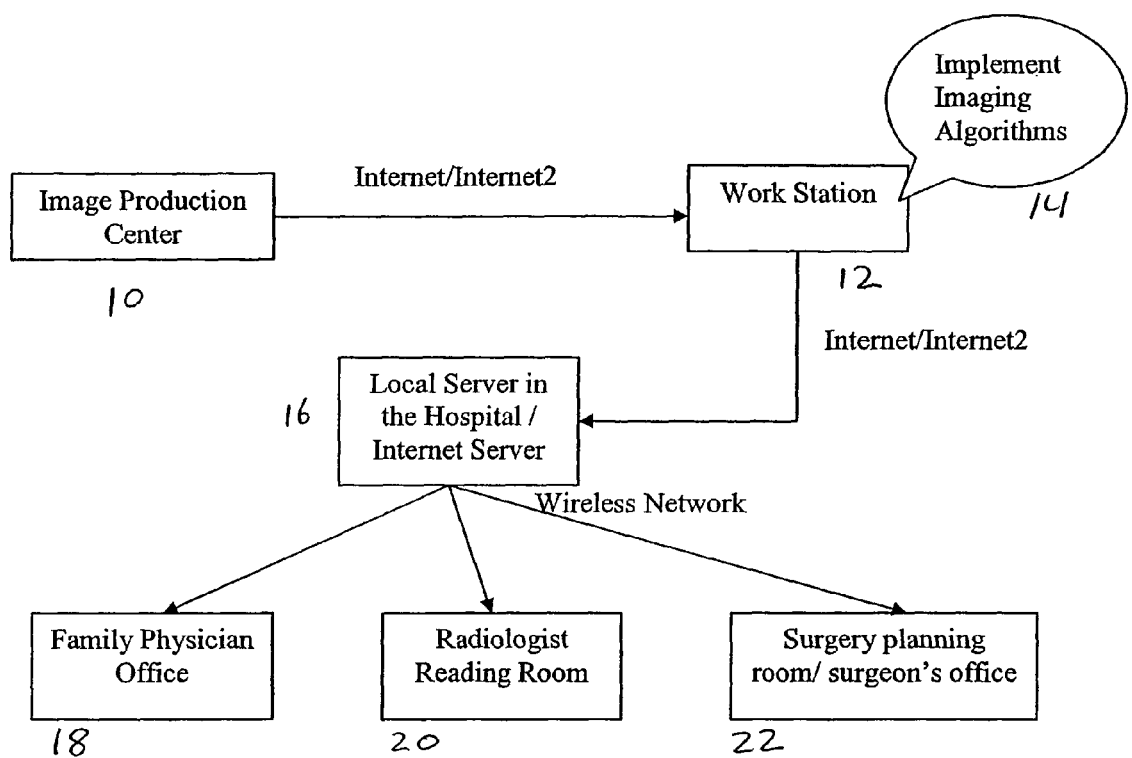
FIG. 23 is a block diagram of the image display system.

FIG. 23 is a block diagram of the medical imaging system. Image production center 10 is any radiographic facility obtaining digitized medical images including without limitations MRIs, CT scans, ultrasounds, PET scans and the like. A work station 12 is connected to the image production center 10 over any computer network, for example, the internet. At work station 12 the imaging algorithms described below are implemented 14. Again via computer network, be it an internet or intranet, the reprocessed medical images produced by the algorithms of the present invention are returned to a server 16 disposed to provide the processed image for user examination. A compiler may be associated with the work station or an intermediate server so that it is available to compile the data set and program from a high level language into a more universally used language, for example C++. Server 16 can be in a hospital, an internet service provider, a medical office facility or otherwise. At server 16 the processed image data is made available to clinicians, radiologists or other users. This may include without limitation a family physician office 18, a radiologists reading room 20, or a surgeon's office 22. Communication between the server and the ultimate users pc, terminal, or display equipment may be by any means, including hardware, computer network connections or wireless connections.

Figure 1:
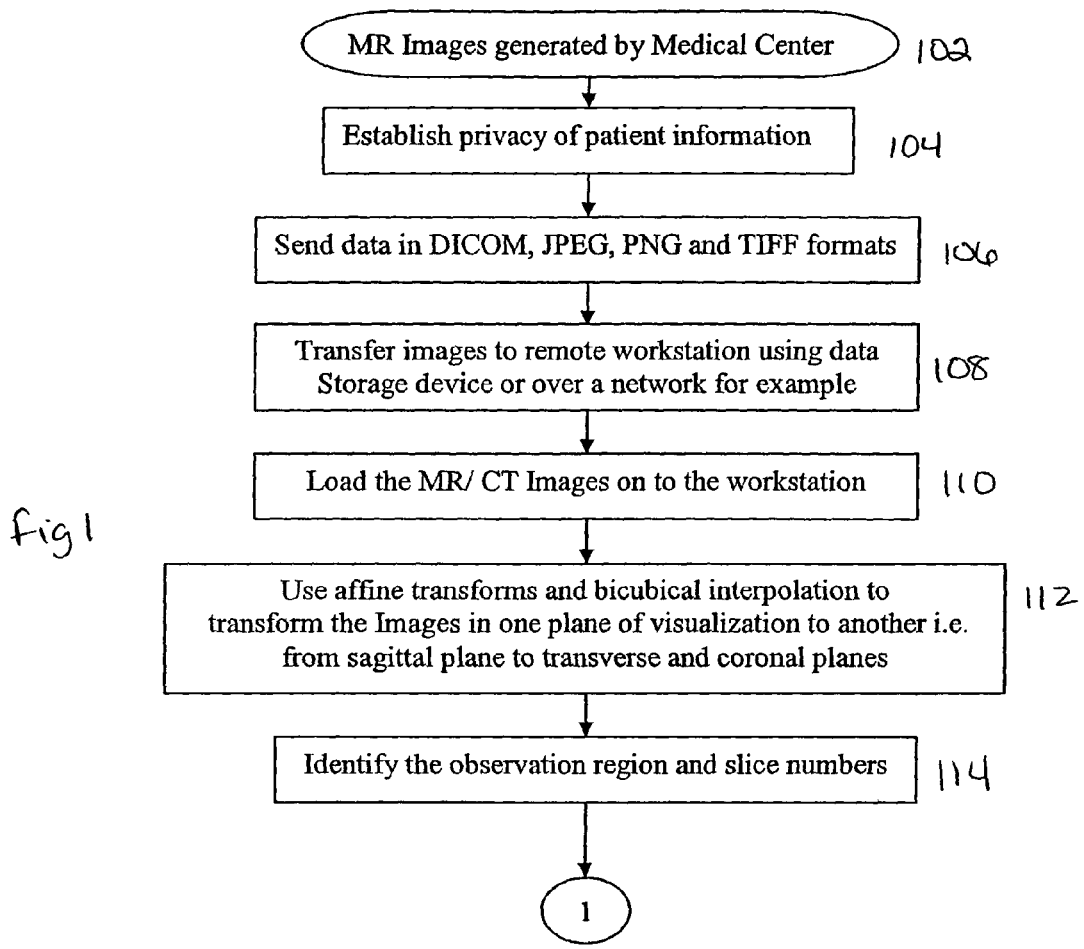
FIG. 1 is a flow chart of an initial dataset receipt.

FIG. 1 depicts the procedure for initial capture and processing of data to be imaged. Radiographic equipment— MRI, CT Scans, etc.,—capture an image dataset from a patient 102. The data set is stored in a short term memory until patient privacy information can be established 104. When the data set has been marked as privacy regulation compliant, it is sent from the radiographic facility 106. Optionally, the dataset may be forwarded without such marking. Typical radiographic equipment used at the point of capture stores its datasets in a DICOM format. It is within the scope of the present invention that patient datasets be stored and transferred either in DICOM, or in any other format, including for example jpeg, png, and tiff files. The patient dataset is then transferred to a remote work station, either by intranet, internet or storage on a storage device such as a CD and manual transfer and loading 108. The images are loaded for processing 110.

Medical imaging has been traditionally performed along three orthogonal planes; sagittal, axial and coronal. Radiographic image datasets are also captured in an operator designated orientation along one of these planes. When a dataset includes a number of adjacent slices along one of the planes, the slice data may be transformed for presentation in one of the planes other than the plane in which it was captured. In the depicted embodiment, such transformation is had at step 112. It is within the scope of the present invention that the transformation be automatic, automatic for certain applications to a designated plane and automatically transformed to a different designated plane for different applications, or may be manually designated. For example, sagital oriented slices may be most useful for use with knee cartilage, as they would be substantially parallel with the plane of the cartilage surface.

Pixels will be generated in columns and rows along slices. The columns and rows will be oriented two dimensionally of course and therefore available for two of the orthogonal axes. For the third, data is not available in adjacent rows and columns of pixels, but rather in stacked slices of two dimensional images. The slices are spaced apart and not adjacent, as are the columns and rows of pixels within each slice. Accordingly, the medical imaging system of the present invention includes an orthogonal transformation routine whereby displaying an image in a third orthogonal orientation different from the two orthogonal axes in which the image slices were originally captured, in other words with the point of view looking between the stack the slices, is achieved by using bilinear interpolation and or by bicubical interpolation. Typical slices are generated at a level of resolution for example of 512 by 512. To display the data set transversely to the planes of image capture, interpolation is used provide pixel or voxels values between the levels of the slices, which are typically on the order of 100 in number.

Figure 2:
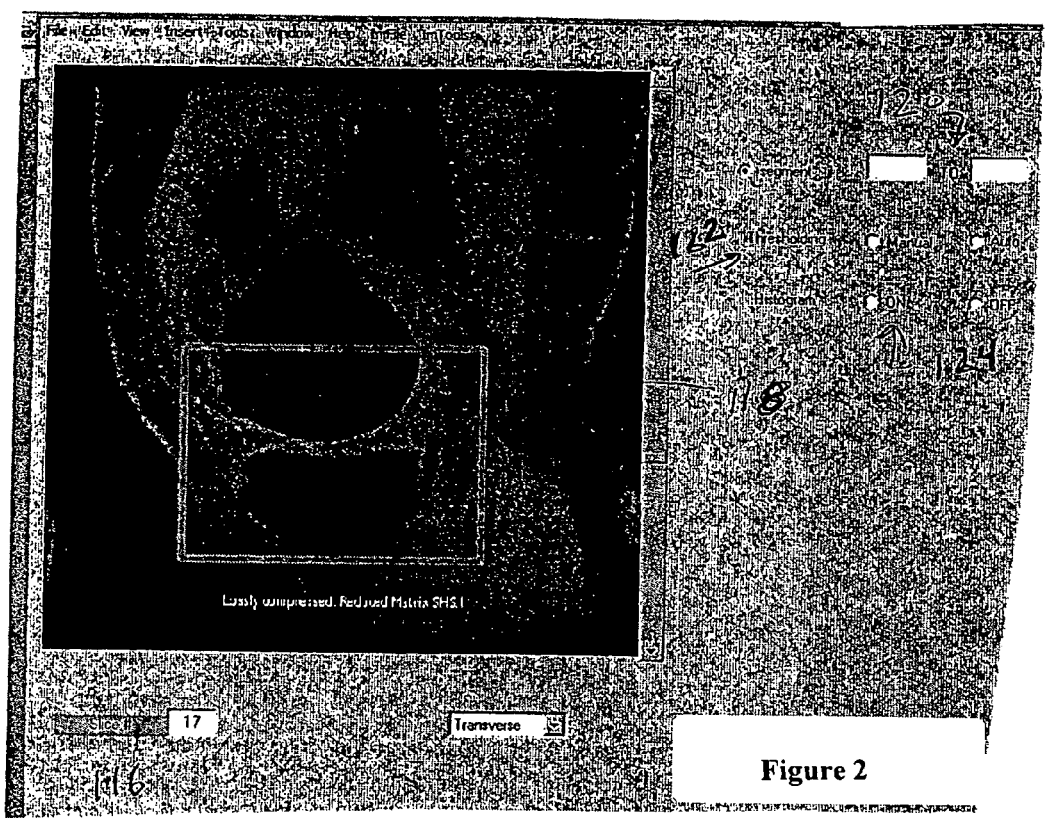
FIG. 2 depicts selection of an image portion to be processed.

The operator of the work station on which the dataset is stored and available for manipulation will designate the observation region and slice numbers acted upon by the imaging process of the present invention at step 114. The selection process is depicted in FIG. 2. It can be seen that a sagittal display of a knee is on view. In order for the operator to identify the observation region, a representative slice needs to be chosen. This slice would of course be deep enough to show the relevant anatomy. In the depicted embodiment, the slice member selected as representative by the operator is slice number 17, indicated at reference number 116. Having selected the representative slice, a cursor is used to block out designated region 118. This designation will identify a beginning pixel row and an ending pixel row and a beginning pixel column and an ending pixel column and store those designations in a short term memory. In order to give depth to a volume of the dataset to which the imaging processing of the present invention is to be applied, the user must also designate a beginning and ending slice number. This is done by filling in fields 120. The number of slices for a radiograph such as a knee vary of course with the machine and operators at hand, however a slice range on the order of magnitude of 100 is typical. In order to designate which of those slices will be used, the operator simply enters a beginning and ending slice in the field 120. Designated beginning and ending slice numbers are also stored in the short term memory. Processing of the designated pixel rows, columns and slice numbers as hereafter described, may also be performed upon the volume data as voxels. Also depicted in FIG. 2 is the field in which the operator may designate manual or automatic processing. This is field 122. The other alternative is manual histogram processing, which may be selected at field 124. FIG. 2 also shows field 116 displaying the splice number displayed at a drop down menu 117 from which the view orientation, sagittal, coronal are transverse may be selected by a user.

Figure 3:
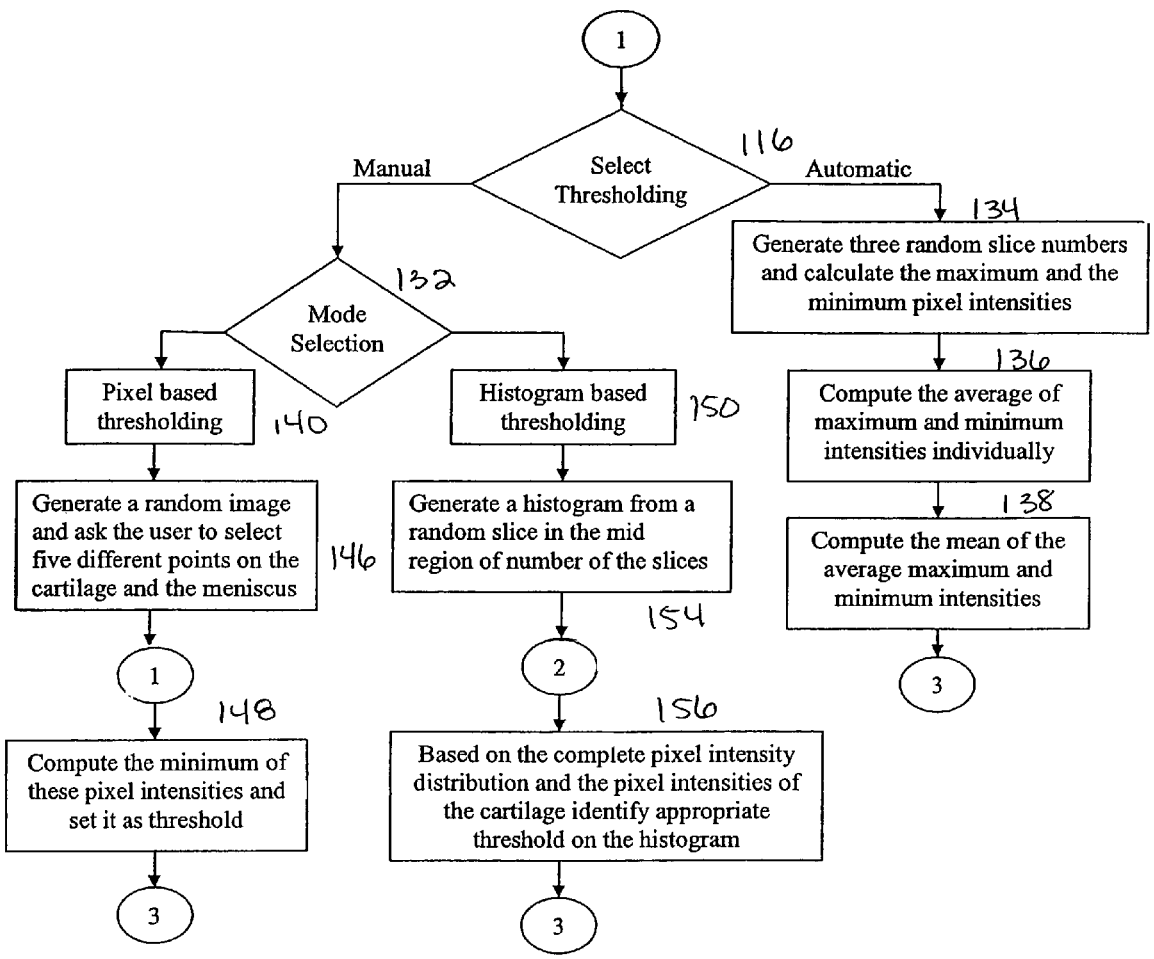
FIG. 3 is a flowchart of thresholding.

The actual processing is controlled by the operator as depicted in FIG. 3. Having designated the volume to be processed in step 114, an operator will select a thresholding technique at step 130. If manual thresholding is selected, the manual mode will be selected at step 132.

In the event that the automatic thresholding is selected a sample slice or number of slices (e.g., three as depicted) are selected randomly from the designated volume at step 134. Thereafter maximum and minimum pixel luminance intensities are calculated. In the depicted embodiment, luminance is used for thresholding, although it is within the scope of the present invention that chrominance values may be used as well. Typically, each pixel or voxel will have an associated grayscale number which is usually designated as any number between zero and 255. In step 134, for each of the representative number of slices selected, the darkest pixel is isolated, that is the pixel with the lowest grayscale value for its luminance, and that value is saved. Also isolated and saved is the grayscale value for the brightest pixel in the slice. For the three slices randomly selected as representative, the average of the minimum luminance intensities will be taken and stored. The same will be done for the maximum luminance intensities at step 136. In this fashion, a range of luminance reflective of the range appropriate for the particular dataset is selected and stored. At step 138, a mean of the averaged maximum and averaged minimum intensities is taken. For example, if the average minimum luminance grayscale value was 50, and the average maximum was 250, the mean would be 150. The calculation of the mean at step 138 will be stored and designated the threshold value.

An alternative method of thresholding is to use gradient steepness as opposed to luminance value. According to this technique, a gradient or difference in intensities between adjacent pixels is calculated. The area in which the steepness is above a preconfigured threshold slope or wherein the slope is within a preconfigured top range of slopes, for example the top ten per cent of all slopes in the selected data set, is designated a boundary.

Figure 4:
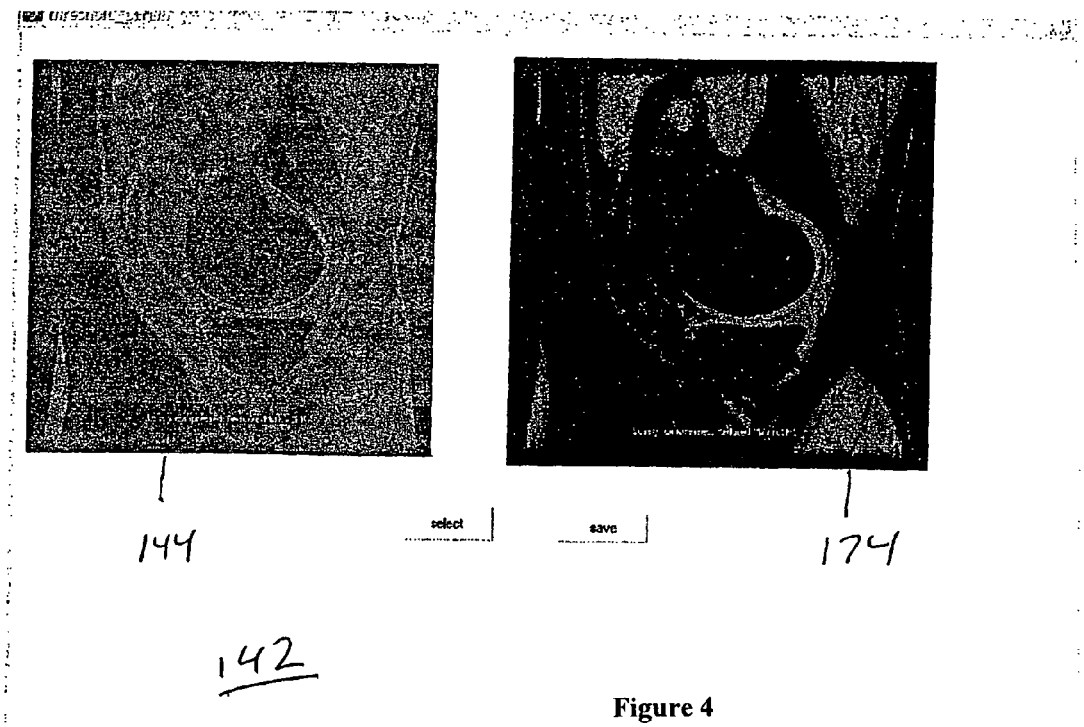
FIG. 4 depicts a manual thresholding option.

There are two modes of manual operation. One or the other can be selected at step 132. Manual mode 140 is pixel based thresholding. Pixel based thresholding allows a operator to more directly control the thresholding operation and to adjust it as the operator sees fit by allowing operator identification of the benchmark luminance levels for the thresholding operation. Consequently, as depicted in FIG. 4, the user may use a cursor for pinpointing localized pixels used for the thresholding operation. The slice displayed for this selection may be random or selectable by the user. In the depicted embodiment it is random. The number of pixels that may be selected may be any number, but in the depicted embodiment five are chosen. Their selection is shown at 142. In the depicted embodiment, a user may select varying points all within the organ to be selected and imaged; that is, several points of high luminosity in the knee cartilage depicted. It is within the scope of the present invention that low luminosity areas may be chosen or both low and high may be chosen, if the operator chooses. After selection at step 146 the computation of a threshold is achieved at step 148 by selecting the minimum value of the multiple pixels selected and setting that grayscale luminance value as the threshold. Alternatively, an average of the selected pixels may be set as a threshold. If the alternative techniques previously mentioned are pursued, both the maximum and the minimum value can be found for dark and light selections and thresholds set at the mean as in the automatic system, or low luminance pixels may be selected for direction if the correspondingly greater amount of data is desired to be included for analysis.

Figure 5:
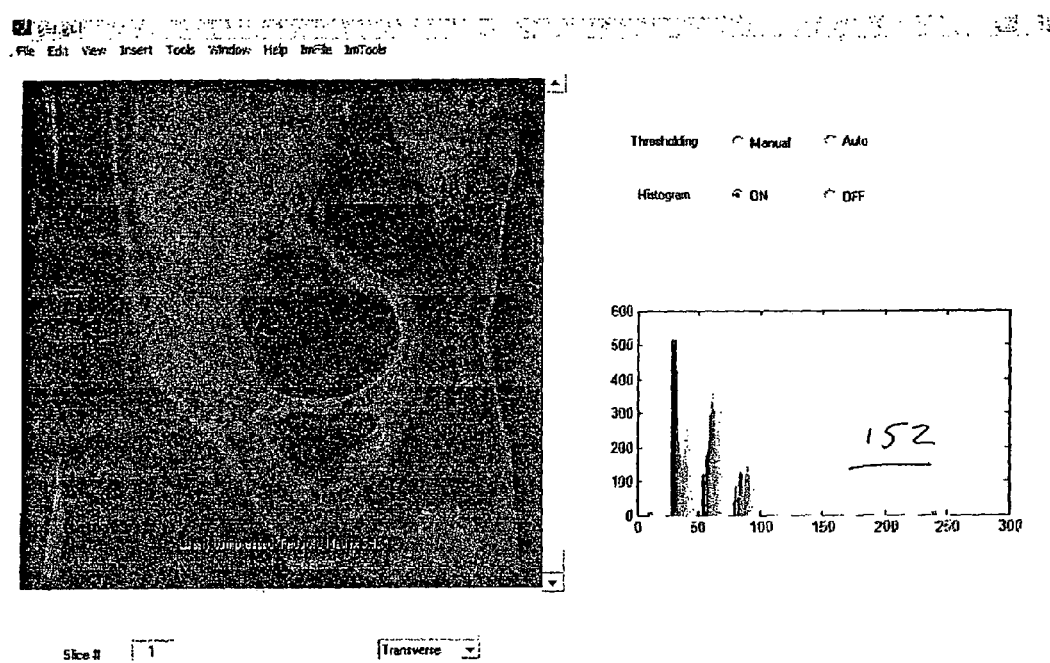
FIG. 5 depicts another thresholding option.

If manual mode 2 is selected, then histogram based thresholding is pursued 150. As displayed in FIG. 5, the histogram based thresholding selection will present to the operator a screen having the slice being used, which may be random or user selected, and also displaying a histogram 152. The histogram displays a bar graph showing a number of pixels corresponding to each luminance level. The number of pixels is displayed on the Y axis and the luminance level is displayed on the X axis. As can be seen, it is in the nature of radiographic studies of this type, particularly studies of the knee, for a histogram to be organized into relatively discreet components. However, the method of the present invention can be applied with or without discreet groups of luminance ranges. The method is for the operator to select a minimum and maximum grayscale luminance level on the X axis and designate it. In the depicted embodiment, designation would be by clicking the cursor on the appropriate points on the X axis. It is anticipated that those luminance levels perceived by the operator to correspond to the organ in question, in this case the knee cartilage, would be selected. This is reflected in FIG. 3 at process step 154. At process step 156, the range of luminance values designated by the operator to correspond to the organ in question, i.e. cartilage, are used to select the appropriate thresholds. It is within the scope of the present invention that the lower luminosity grayscale value numbers selected by the operator be used as threshold, with the dataset for higher luminance values above the threshold to be retained for further processing. It is also within the scope of the present invention that both the low and high threshold may be set such that data retained for further processing will be not only that with the luminance above a minimum threshold, but that within a range selected by the operator on histogram, the range having both a high and a low value.

For thresholding, a value may be stored in short term memory and carried forward from slice to slice. Alternatively, thresholding may be adaptive, that is, calculated independently for each slice.

Figure 6:
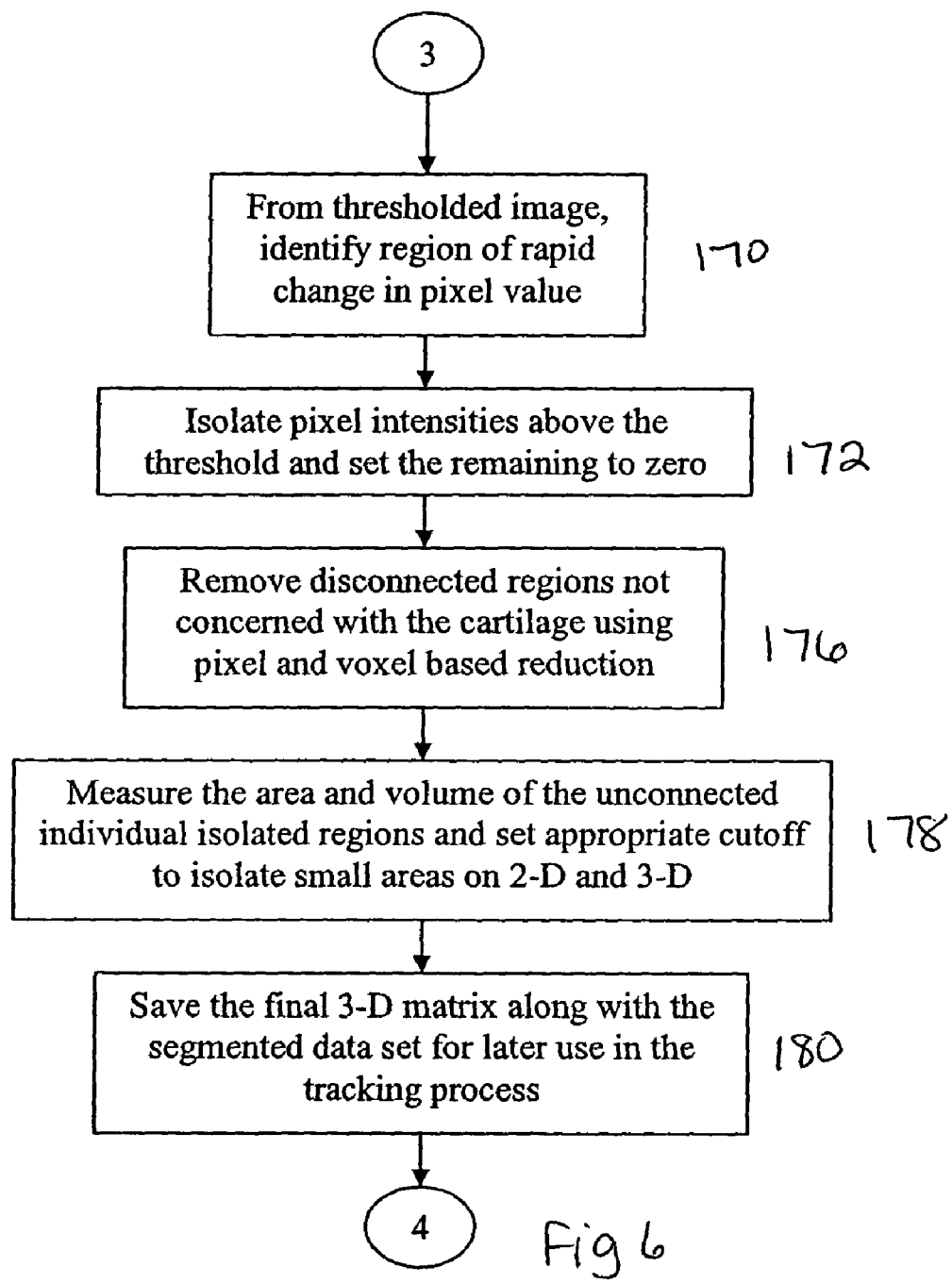
FIG. 6 is a flow chart of volumetric consolidation.

Through any of the three techniques or their corollaries described above, a threshold luminance grayscale value number will be obtained. As shown in FIG. 6, the first step in further processing is to identify the boundaries of the organ in question, knee cartilage in the example, 173. This is done by zeroing all the pixels below the threshold value. That is, for every pixel having a luminance grayscale value less than the threshold value obtaining the previous algorithms, the pixels value is reset to zero at step 172.

Figure 7:
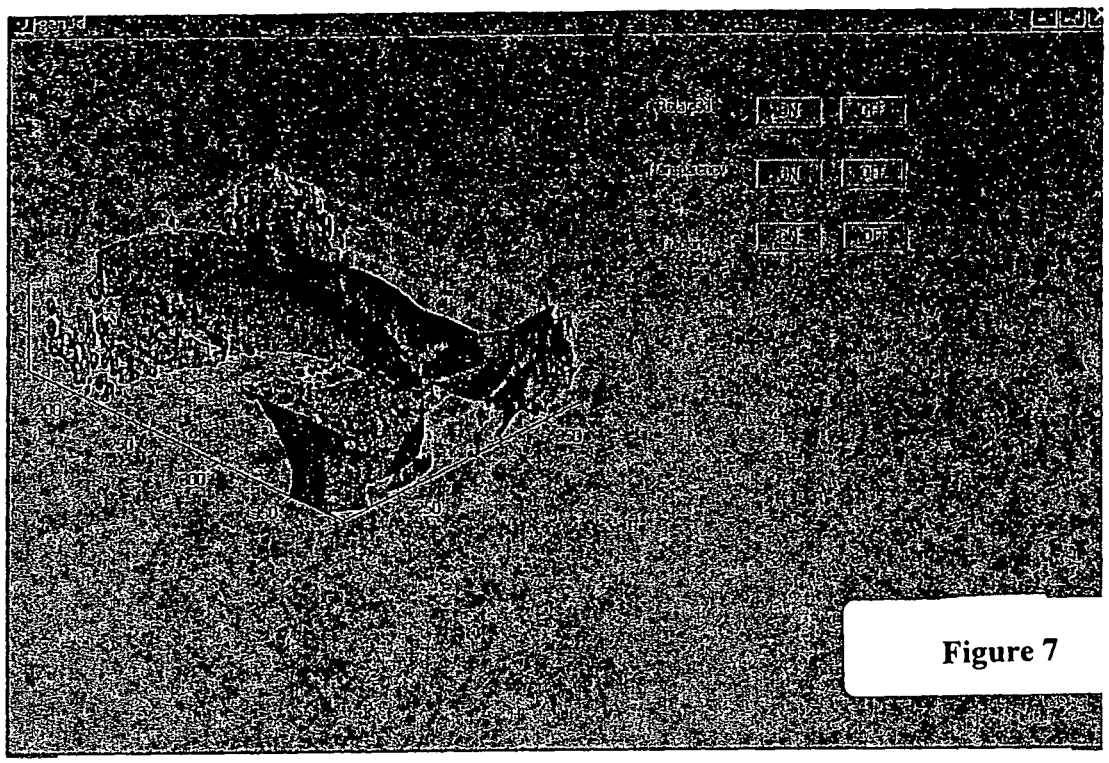
FIG. 7 depicts an unreduced volumetric image.
Figure 8:
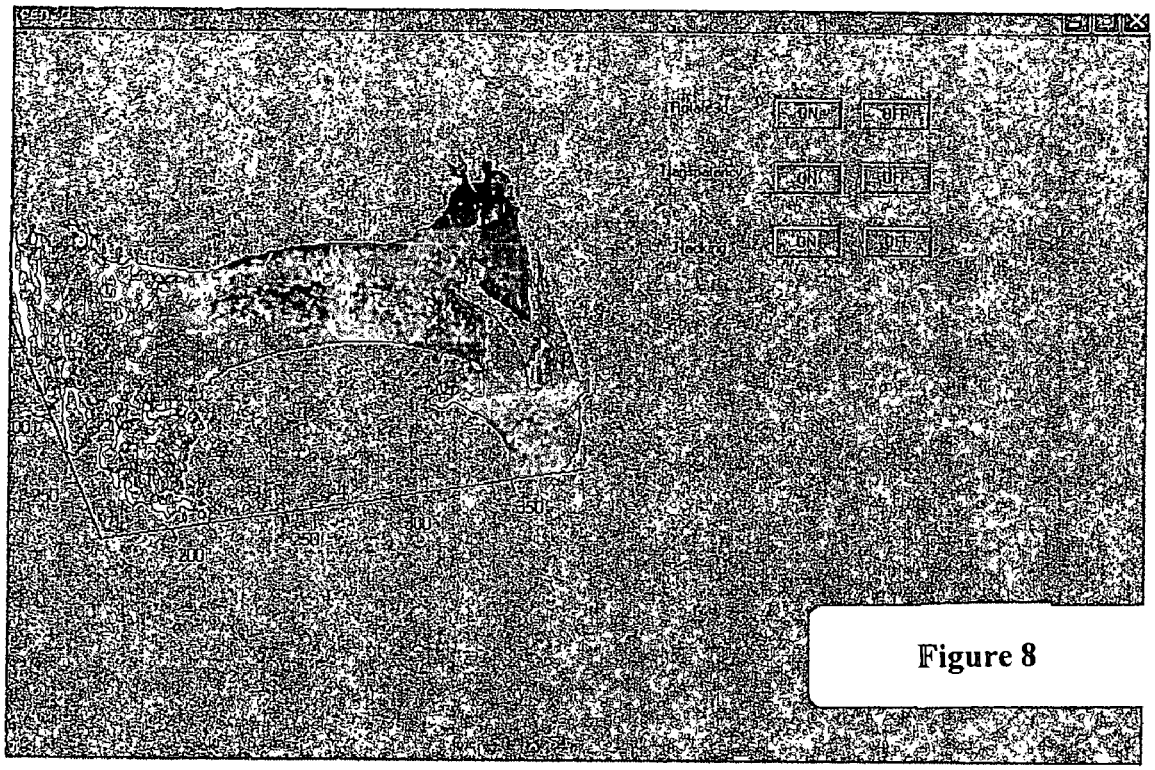
FIG. 8 depicts an unreduced volumetric image.

Processing is now had to offer the user the option to display the data corresponding to the pixels above the threshold as a three dimensional image. This is done using the crossing test according to the Jordan curve theorem to isolate faces established by adjacent pixels above the threshold value. A plane ray intersection test may be used to calculate coordinance. Techniques including isosurfacing and isopatching may be used. The data may now be displayed as a three dimensional image such as depicted in FIGS. 7 and 8.

Repeating this processing for each of the selective slices will produce a dataset appearing in a two dimensional figure as the high contrast image on the right hand side of FIG. 4 at reference numeral 174. Taking all the selective slices together, the product of the thresholding operation up to step 172 would be a dataset reflecting a three dimensional value such as that depicted in FIGS. 7 and 8. As can be seen, the organ depicted in three dimensions by its representative volume data in FIGS. 7 and 8 includes both the area of interest but also a great deal of material outside the area of interest that nevertheless was reflected in pixels above the threshold value. A group of such reflective body volumes is apparent in the left hand corner of the volume in FIGS. 7 and 8, at the reference line 200 on the X axis. In some circumstances these volumes can be obtrusive to the diagnostician in viewing the organ in question and its lesion or pathology. Accordingly, it would be desirable to generate an image in which these smaller volumes representing tissue that is not part of the organ of interest are eliminated. This achieved at the process step 176. At step 176 all rows and columns of pixels in each slice, or, alternatively all voxels, are run and compared to adjacent pixels to determine boundary areas containing a volume of pixels or voxels above the threshold luminance level. Volume may be quantified by summing pixels, summing voxels, summing grayscale values for pixels within the boundaries, summing chromiance values, or otherwise. Each volume for each separate group is stored in short term memory, preferably in RAM, as described in step 178. Thereafter, the volumes of all the separate imaged bodies are compared. One of them, corresponding to the organ isolated for imaging by the operator, will be much larger than the rest. Accordingly, a threshold volume amount can be selected at step 178 such that above the volume threshold there is only one object—the organ selected for imaging. Below the threshold are tissue volumes of no interest. The small volumes are eliminated.

Now the thresholded, isolated and edited dataset will be stored at process step 180 to a three dimensional matrix. Segmented data representing rows and columns of pixels in selected slices shall also be saved.

Figure 11:
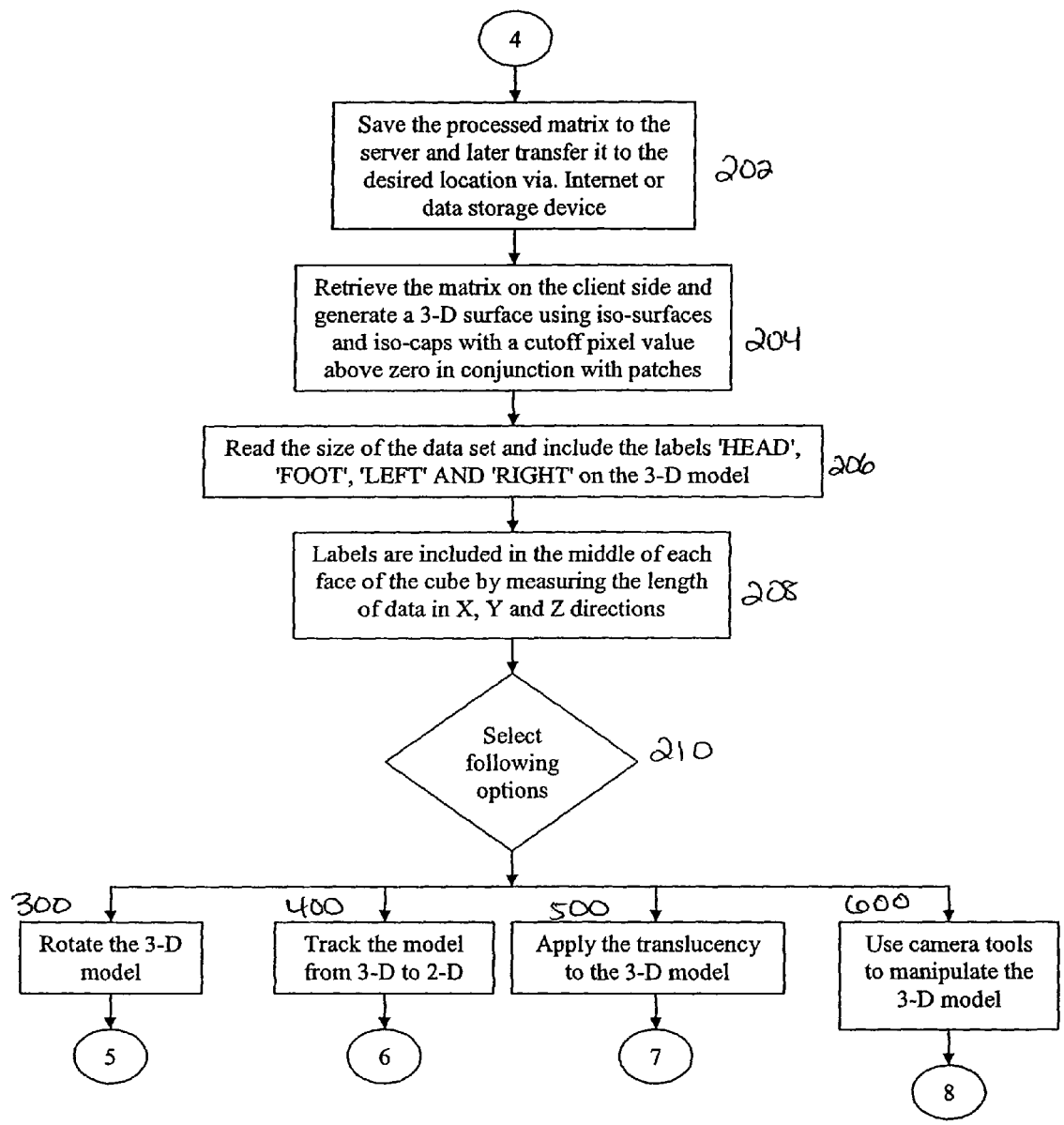
FIG. 11 is a flow chart of processed matrix additional processing.

The processed matrix data saved in step 180 may be saved to a server. It may be transferred to other locations for work and/or examination via any known means, including intranet, internet or data storage devices, as indicated in step 202 as shown in FIG. 11. A processed matrix is distributed for display to a work station computer or display device, "thin" device or tablet, as for example by an examining radiologist. The work station may be equipped with an imaging software module, or, in the alternative, the processed data matrix may be forwarded to the work station with a self executable .exe file. The executable file may be restricted for use only with a particular processed matrix data set.

Rather than measuring volume of thresholded bodies reflected in the dataset pixel by pixel, an alternative method is to process the data volumetrically and analyze it voxel by voxel. In the depicted embodiment, it is not merely the number of pixels or voxels that is summed for the volume entry, although that is a viable alternative within the scope of the present invention. In the depicted embodiment, the luminance grayscale values for each pixel are summed to perform the volume analysis.

For examination, the processed matrix in most applications will be viewed as a three dimensional surface. Three dimensional display in the depicted embodiment may be had by using isosurfacing and isocapping techniques with patching techniques. Other three dimensional surface display techniques may be used in the scope of the present invention. Isosurfacing, isocapping and patching are available through Matlab® version 7.0 which is incorporated by reference herein.

Figure 9:
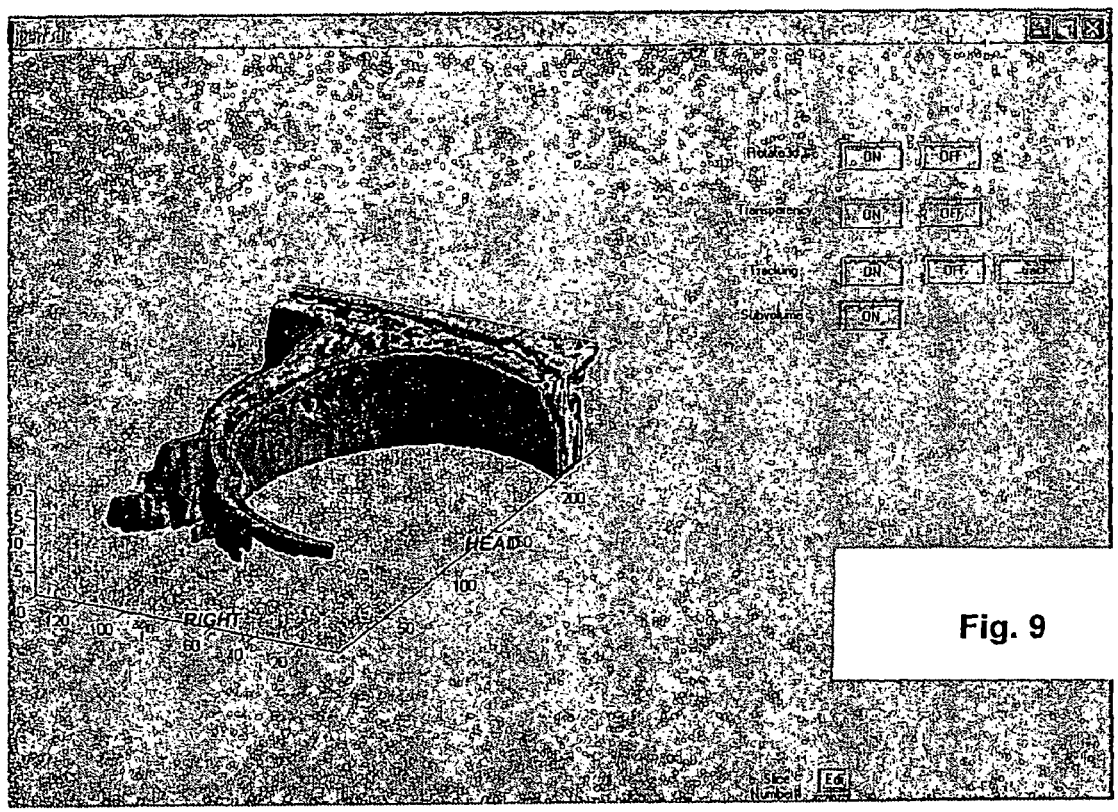
FIG. 9 depicts a volumetric three dimensional display.
Figure 10:
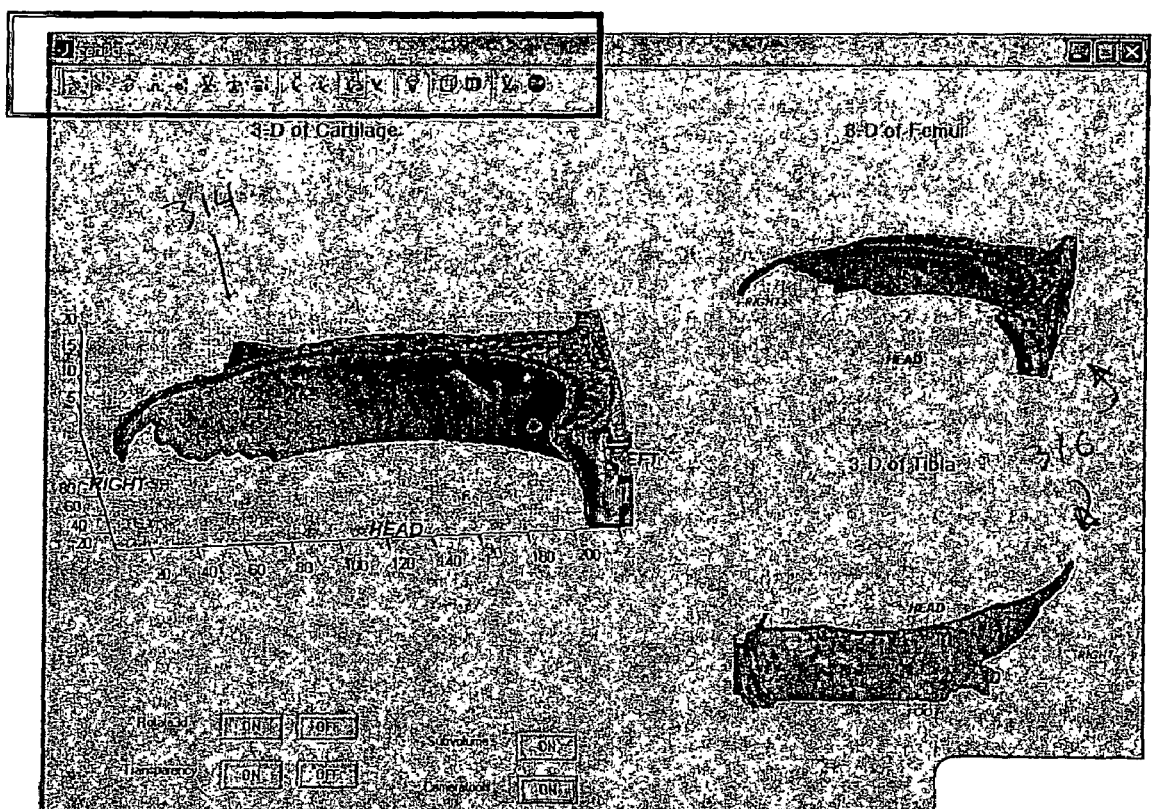
FIG. 10 depicts a volumetric three dimensional display.

The volumetric three dimensional surface display of step 204 is depicted in FIGS. 9 and 10. The three dimensional view may be rotated by a user, for example an examining clinician. Varying aspects of the anatomy may be reviewed for diagnosis, monitoring of the progress of medical treatment, patient display or planning surgery.

As a further utility, at step 206 the display includes orientation labels. In the depicted embodiment, these include "head" and "foot" on one axis and "left" and "right" and on an opposing axis. The labels are displayed in appropriate positions as indicated in step 208.

Having achieved a three dimensional surface display and properly labeled it, the user can select among at least four options in the depicted embodiment at step 210. These include rotating the three dimensional model 300, tracking the model 400, applying translucency 500 and use of camera tools to manipulate the three dimensional model 600.

Figure 12:
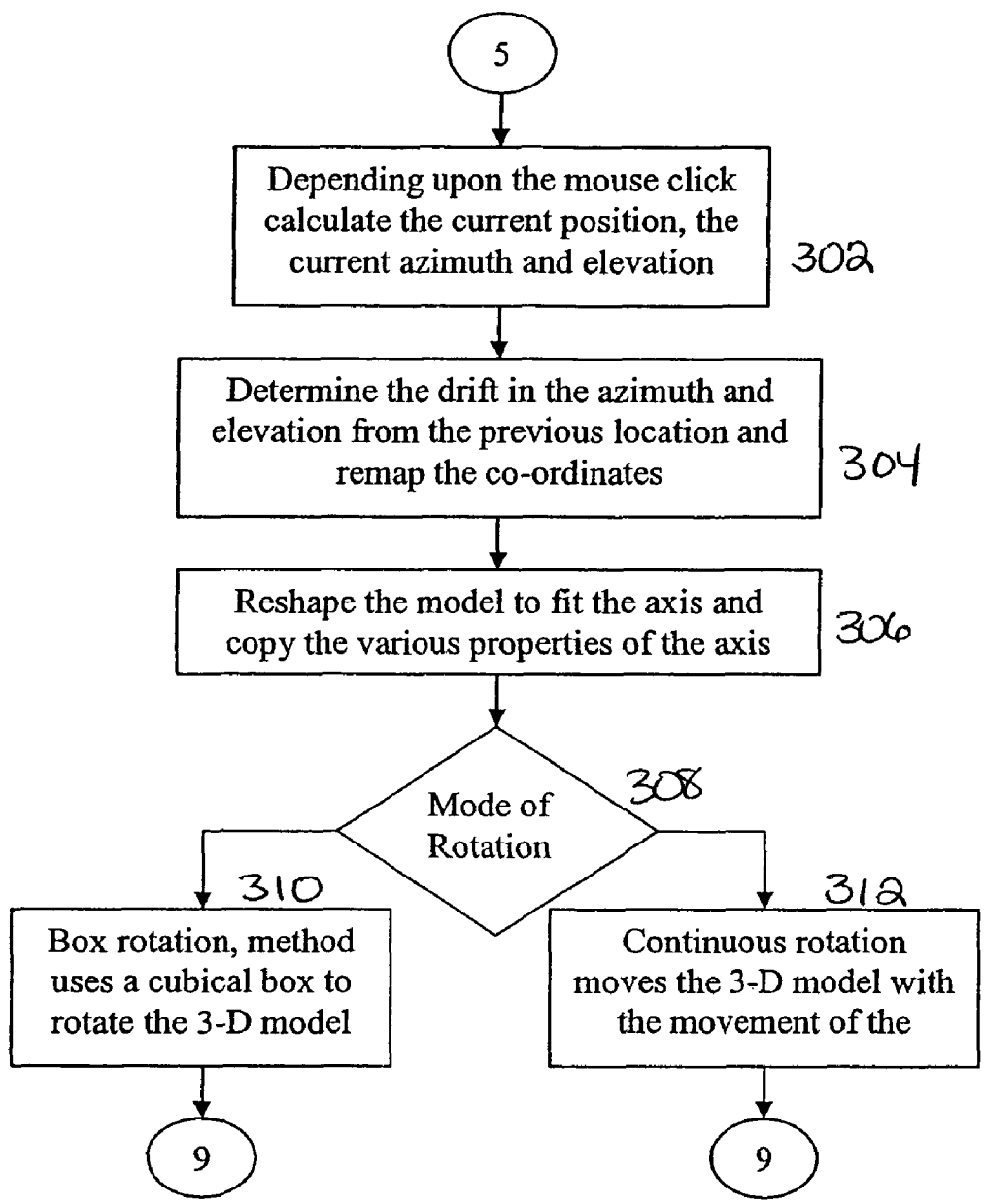
FIG. 12 is a flow chart of rotation of a three dimensional mode.

FIG. 12 depicts the steps of rotation of the three dimensional model. Rotation is executed by first calculating the current position azimuth and elevation as designated by a mouse click at step 302. Remapping is had at step 304 by determining the drift of the azimuth and elevation, to which the three dimensional model is remapped. The model is saved to the new axes and displayed in its new configuration at step 306. In the depicted embodiment, displays are updated by transform expressions of first data points as changed by user controlled rotation. The user may select two modes of rotation at step 308, including rotation including with the Cartesian box display 310 illustrated at 314 on FIG. 10 or continuously without a box, step 312, illustrated at 315 on FIG. 10.

Figure 13:
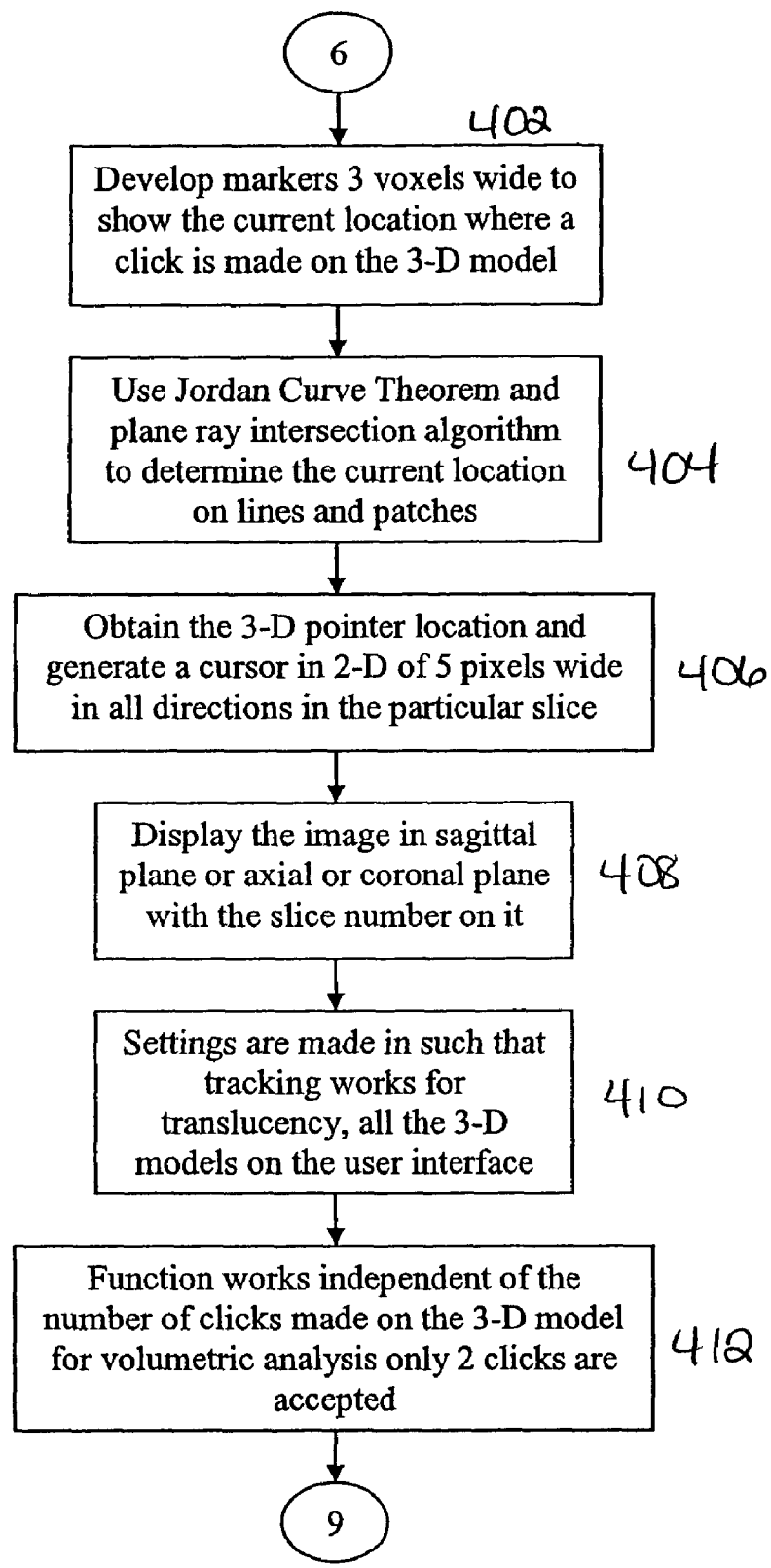
FIG. 13 is a flow chart of tracking of a three dimensional mode.
Figure 14:
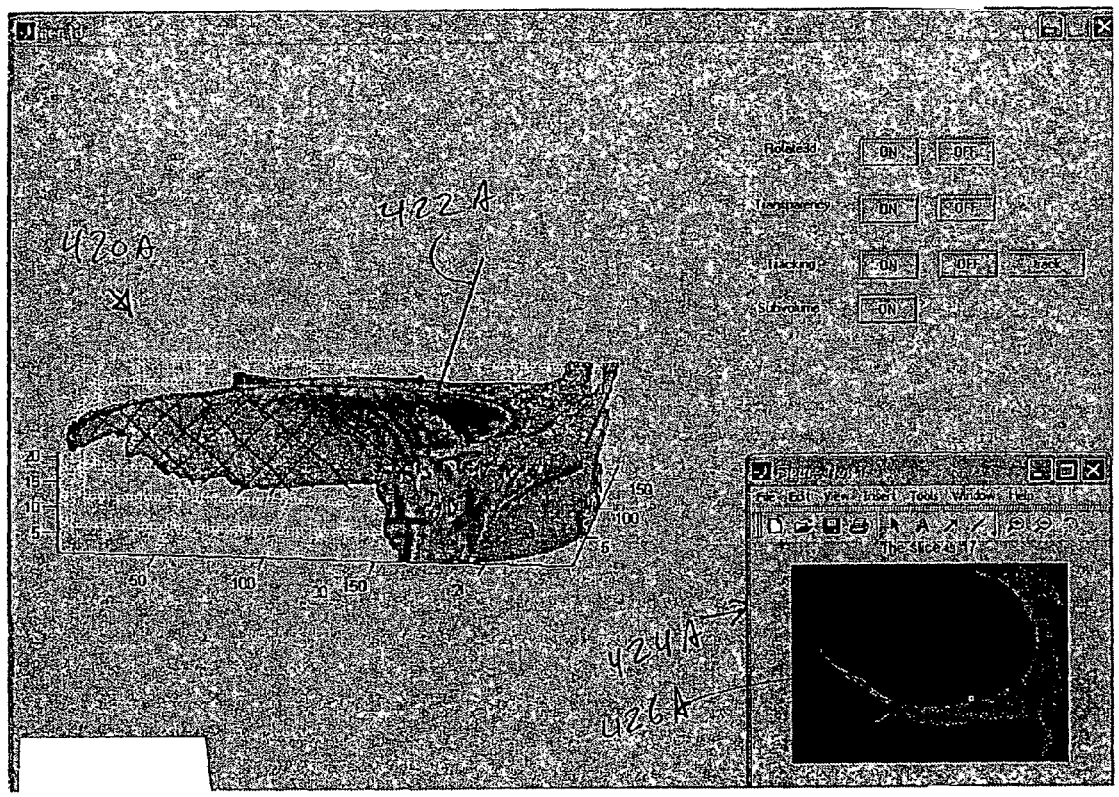
FIG. 14 depicts tracking images.
Figure 15:
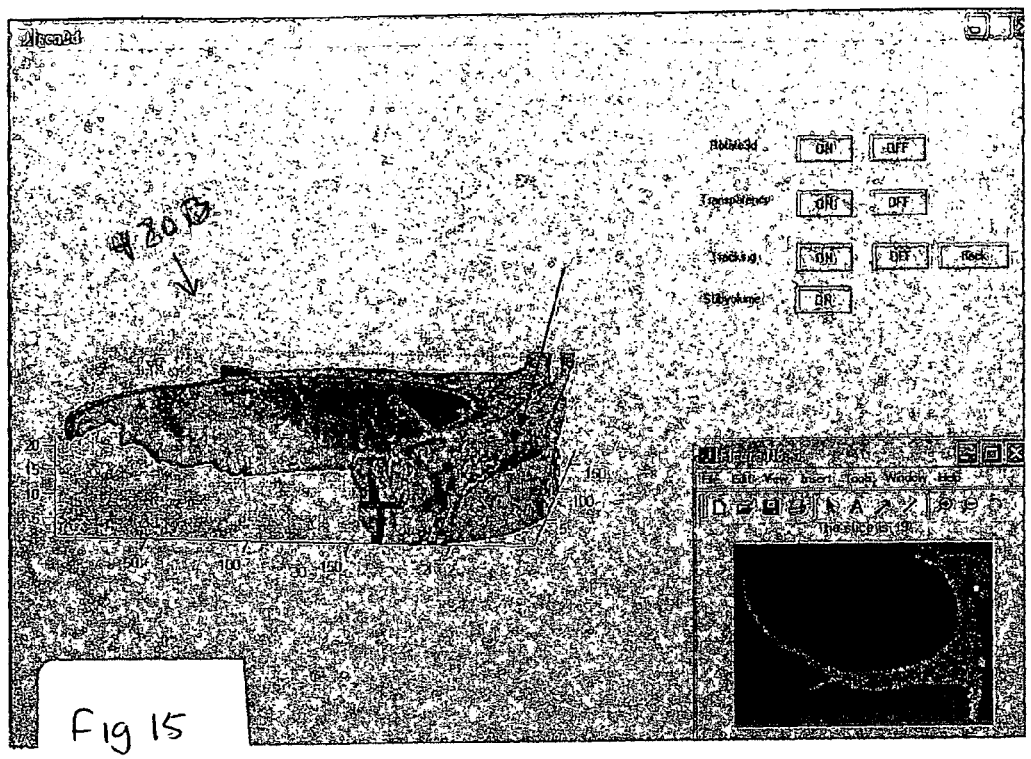
FIG. 15 depicts tracking images.
Figure 16:
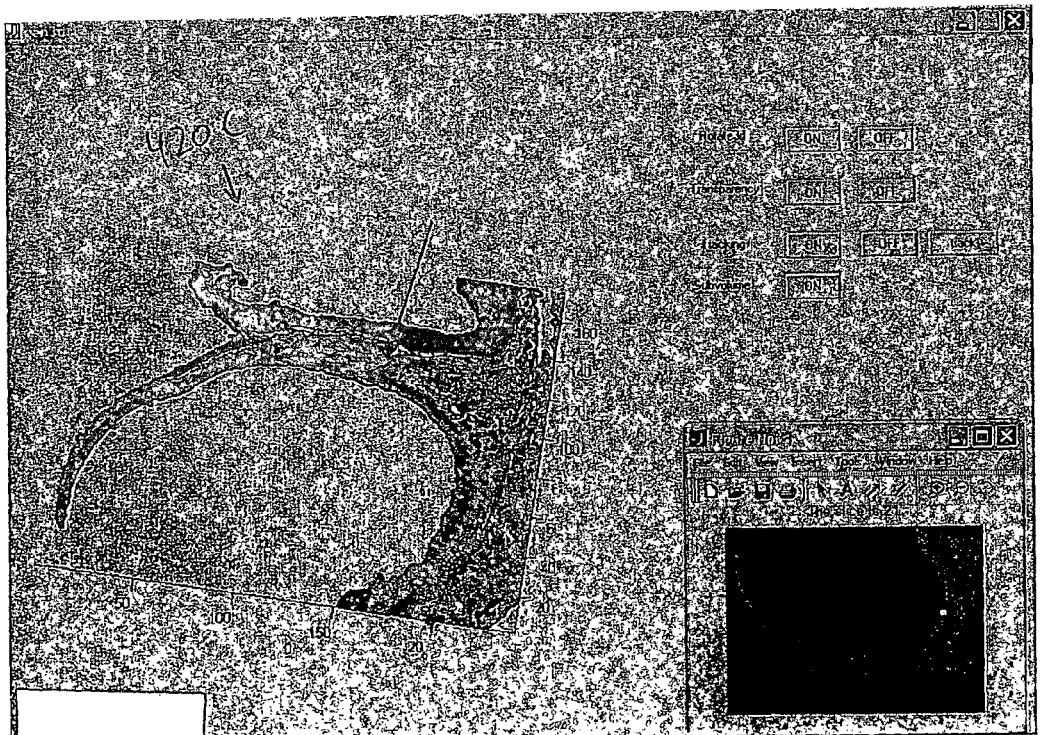
FIG. 16 depicts tracking images.

FIG. 13 displays a flow chart of the steps taken for tracking the model, that is, displaying the two dimensional slice corresponding to an exact location indicated by the user on the three dimensional display. Examples are shown in FIGS. 14, 15 and 16. As indicated therein, the three dimensional volumetric is displayed at 420. First a cursor or arrow is available for the user which may be moved with his mouse at 422. The arrow identifies a particular point on the surface of the volumetric image. Through the process shown in FIG. 13, a two dimensional display 424 will bring up the two dimensional slice image from the stored processed matrix and display it. Included on the two dimensional display will be another cursor indicator, shown as a white square at 426 in the figures. The white cursor 426 will move in correspondence with the arrow cursor in the volumetric image 422. If the volumetric cursor 422 moves through an axis requiring the display of a different slice, that slice will appear at two dimensional display 424.

These simultaneous displays are achieved by designating a three voxel cubic marker in the process matrix that corresponds to a selection of a point on the volumetric image with the arrow 422, at step 402. In the depicted embodiment, selection is by a mouse click. Thereafter, in the depicted embodiment, the Jordan curve theorem is used to correlate the selected voxel with the faces of the volumetric image. At any point of correspondence, the plane ray intersection test is used to calculate the coordinates. This is done at step 404. At step 406, the white cursor 426 is generated on the two dimensional display 424. A processor looks up in memory identifying location designations for the selected volumetric position, for example, pixel row, column and slice. That data is sent to a routine controlling display of the white cursor 426, which then displays the white cursor 426 at the sent location. The two dimensional display 424 may be in any of the recognized planes; axial, coronal or sagittal. The user may select the plane at step 408.

Figure 26:
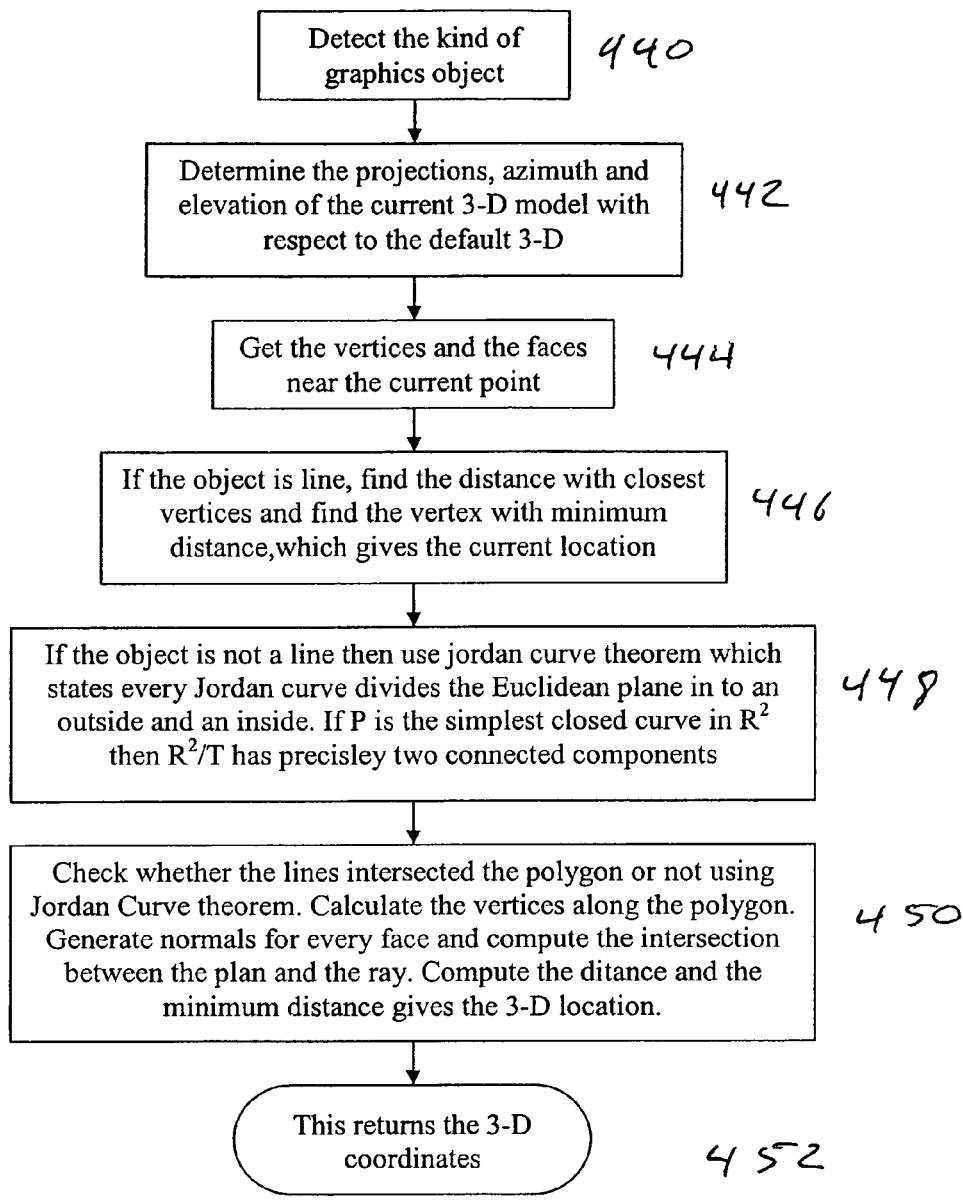
FIG. 26 is a flow chart for tracking a pointer.

FIG. 26 expands step 406 from FIG. 13 to disclose the routine used to obtain the 3-D pointer location to generate a cursor in the 2-D representation. At step 440, the kind of graphics object, i.e. a line or a patch, is determined. At step 442, the projection azimuth and elevation of the current 3-D model are determined with respect to the default 3-D orientation. At step 444, vertices are obtained for the surfaces of the volume from the volume matrix. The faces of the cube are also obtained at step 444. The face that is selected are those nearest the current point, which is the pixel most near the cursor location.

If the object is a line, the routine finds the distance to the closest several vertices and selects the vertex with the minimum distance, thus generating a current location. If the object is not a line, then the Jordan curve theorem is used again. If the patch ("p") is the simplest closed curve in the radius of the area ("$R^2$"), then $R^2/T$ describes the two connected components. The lines are checked for intersection of the polygon, 450. The vertices along the polygon are calculated and normals are generated for every face. The intersection of the normals is used to determine the ray having the shortest distance between the intersection and the nearest patch, thus generating the 3-D location, 450. Thus the 3-D coordinates are returned, 452.

Box 410 indicates the tracking of a position on a two dimensional display of the sagittal, coronal or axial views may be tracked in any of the three dimensional display options, including transparencies settings, any 3-D view or subvolumetric display. Box 412 indicates that when the function is selected, it is independent of the number of clicks made on the 3-D model with the cursor. That is to say, subvolumetric analysis is made, as described below, by indicating a volume with cursor clicks. As indicated in box 412, the tracking function may be selected, maintained and displayed before, during and after the process of selecting and displaying a subvolumetric display.

Figure 17:
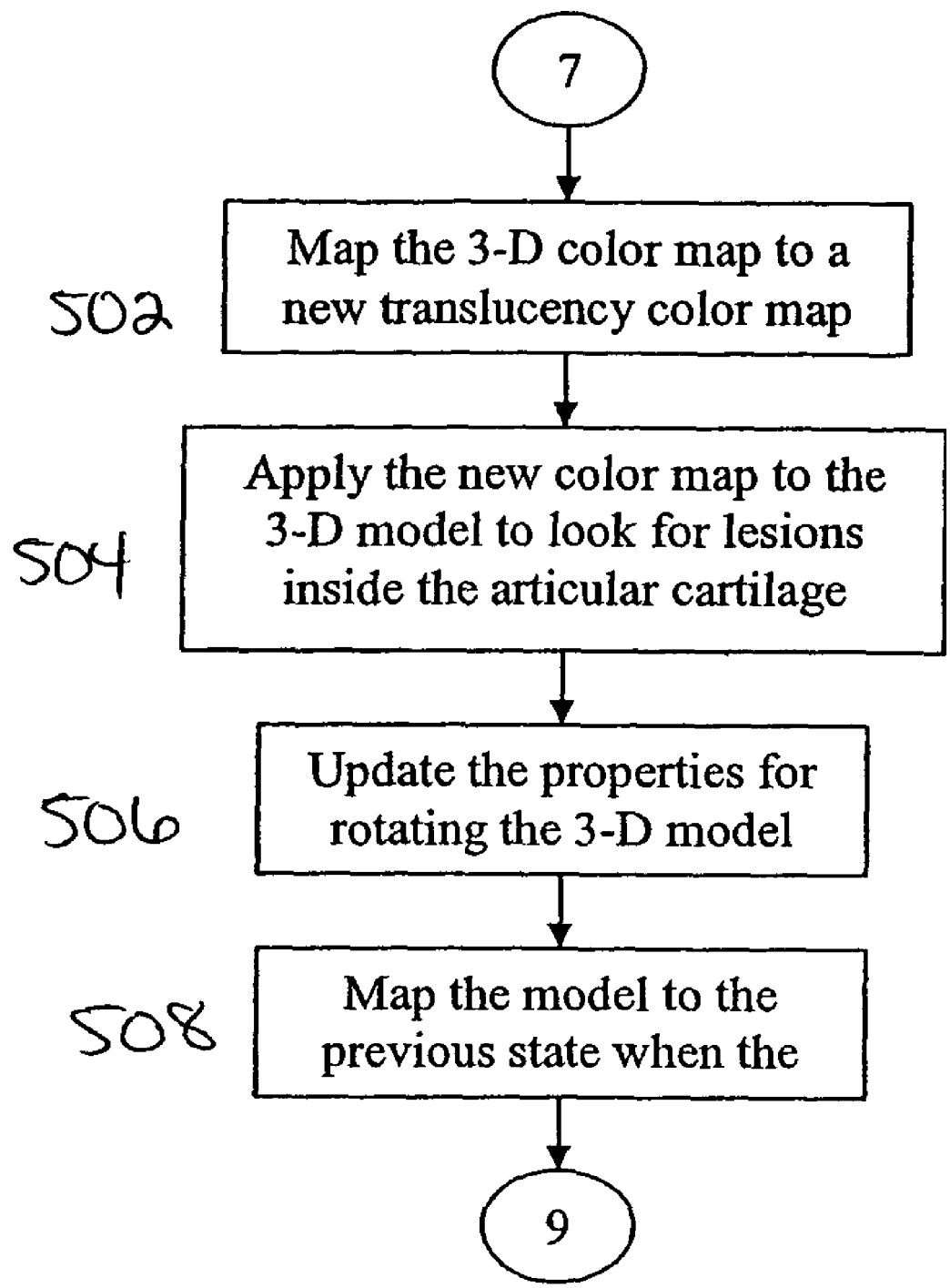
FIG. 17 is a flow chart for applying translucency.
Figure 18:
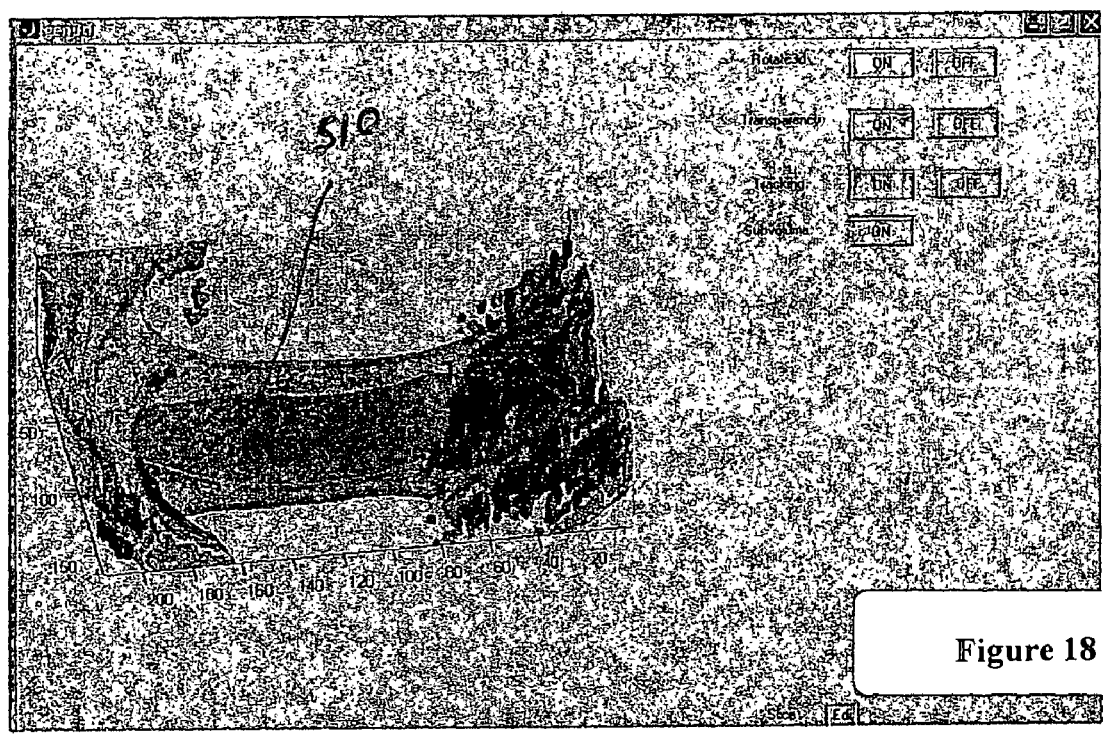
FIG. 18 depicts a translucent image.

FIG. 17 displays the process for imaging the processed matrix in transparency, as shown in FIG. 18. In step 502, a color map is generated for the volumetric image. A translucent color map is chosen. Each pixel is assigned a new value of luminance or chrominance according to transparency values. That is, from a selected view, a pixel will represent a line extended from the position of the viewer through the 3-D volume to the vanishing perspective point. A transparency value is a summation of assigned luminance or chrominance values for each pixel along that line. According, where the 3-D model indicates multiple surfaces for multiple structural items, the pixel along that line will sum the luminous or chrominance values for each structural inner face along the line. Accordingly, it will be darker if there is more structure or surfaces along the line, and lighter, that is more transparent appearing, if there is only the front and back surfaces along that line. Accordingly, internal lesions having extra surfaces and structural features, will appear as a darker for each pixel overlying the lesion in the selected view. Translucency is applied to the three dimensional model at step 504. Color is assigned for orientation. Which color is assigned to which surface orientation is arbitrary, for example upwards facing surfaces may be designated orange, laterally facing surfaces designated blue and downwards facing surfaces the assigned green values. This colorization helps the user perceive the 3-D model in a conveniently spatial oriented display. Rotational properties are updated at step 506. The rotation routine described at steps 302 through 312 may be repeated at this point. As a further optional feature, the map may be reset to its previous color map when the translucency feature is turned off by a user, 508. The translucency feature emphasizes one of the advantageous utilities of the present invention. Internal lesions such as for example indicated at 510 in FIG. 18 are visible and their extent is accurately reproduced. In prior art three dimensional models only displayed a surface manifestation of an internal lesion, which may partially or completely obscure the extent of injury beneath the surface.

Figure 19:
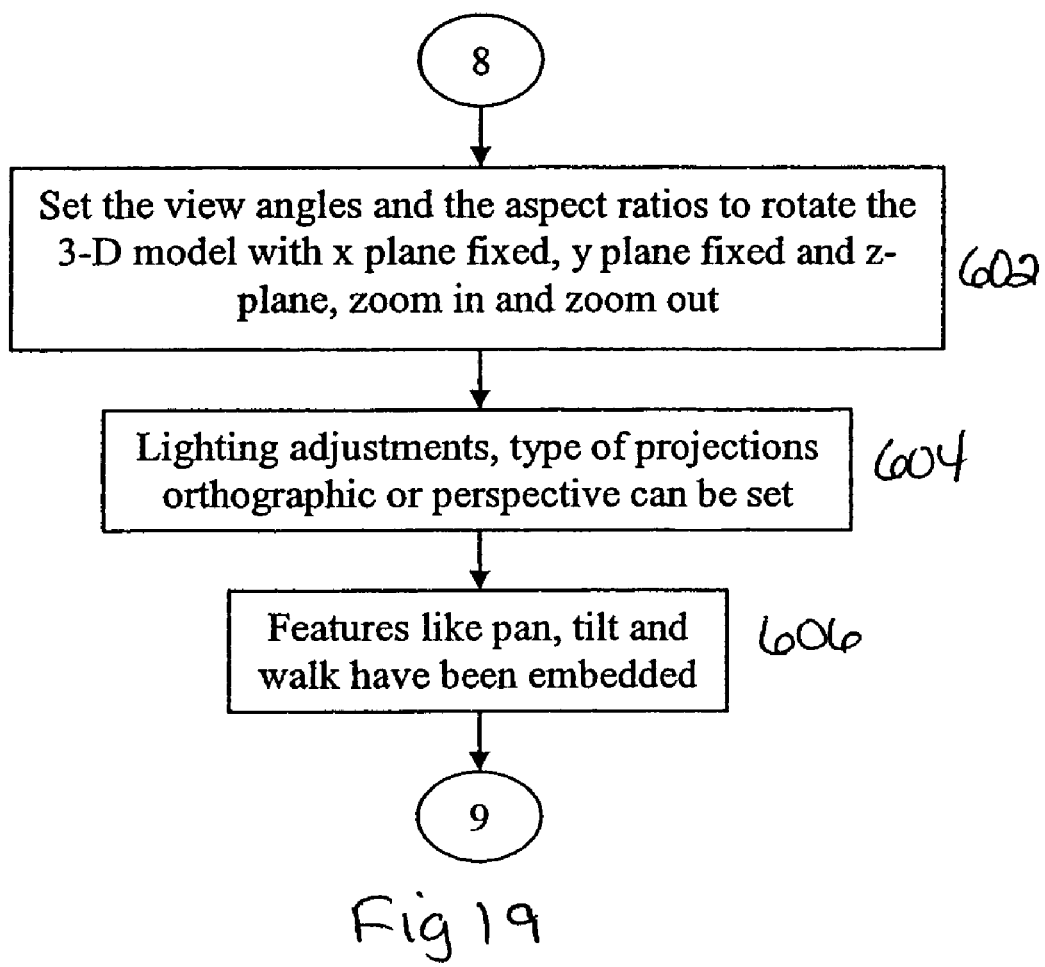
FIG. 19 is a flow chart of camera tool steps.

FIG. 19 depicts the steps for operating certain camera tools. These may be packaged in order to forward them with an executable file to a user work station for display. These include steps of setting the viewing angles to zoom with any of the three fixed orthogonal planes at step 602. Rotation is achieved by rotation around fixed axes. Accordingly, after a user indicated degree of rotation has been achieved, pixel luminance values on the user display are recalculated to correspond to the new angle of viewing. The calculation is according to the rotations relative to the pixel values assigned in the original viewing angle. Features such as lighting adjustments, projection type, orthographic or perspective views may be included at step 604 and further features such pan, tilt and walk at step 606. Other "camera" features available to manipulate image for a viewer assistance or convenience include any that may be imported into the application from other imaging applications. These include without limitation; orbit camera, orbit scene light, pan/tilt camera, horizontal or vertical movement, forward or backward movement, zoom, roll, rotated around any principle axis X, Y or Z, toggling scene light, orthographic projection, perspective projection, resetting perspective and lighting, stop camera/light motion and resetting a target point.

Figure 20:
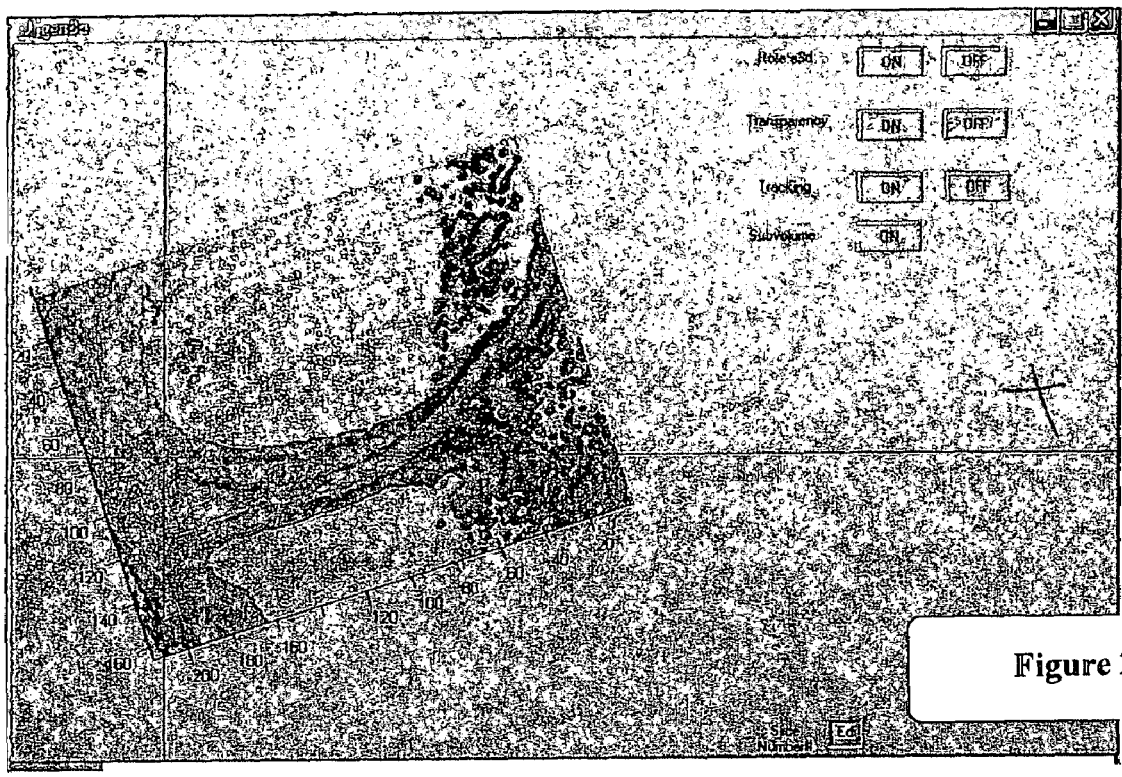
FIG. 20 depicts sub-volumetric selection.
Figure 21:
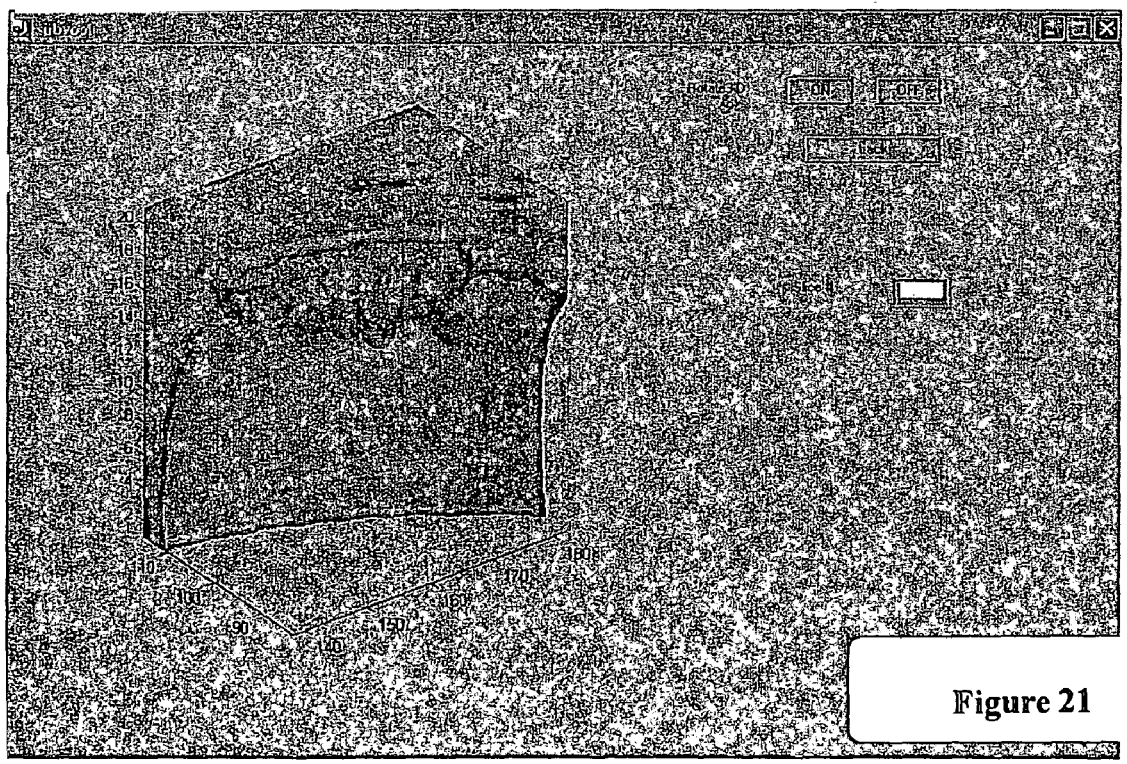
FIG. 21 depicts sub-volumetric display.

A further feature of the present invention is a subvolume display as shown in FIG. 21. A user selects a subvolume with the cursor as shown in FIG. 20 by clicking on two selected points. These points are treated as opposing corners that define a cube and that volume is displayed in an enlarged format scale as shown in FIG. 21.

Figure 22:
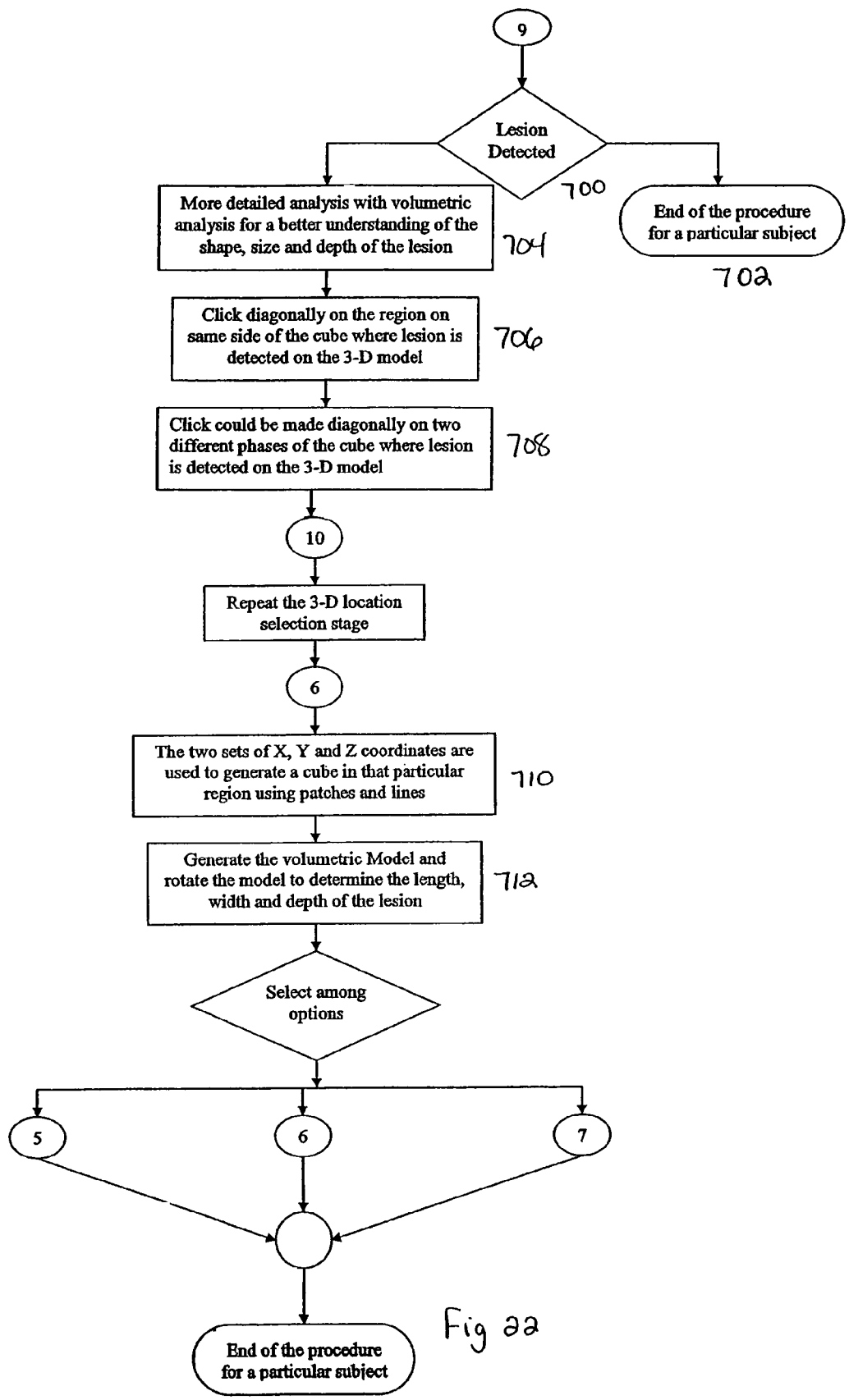
FIG. 22 is a flow chart of sub-volumetric display steps.

FIG. 22 displays the steps for use of the imaging technology by a physician. Upon examination using the image manipulation modalities outlined above, the physician may or may not detect a lesion 700. If he does not, the procedure is finished for that patient 702. If it is, the subvolume display may be selected 704 and executed 706 by clicking the cursor at two diagonally opposed points preferably surrounding the lesion. The subvolumetric display may also be displayed from different phases of the model 708. After selection, two sets of XYZ coordinates are used generate the cube 710 and the subvolumetric display is generated and displayed such as shown in FIG. 21.

Figure 24:
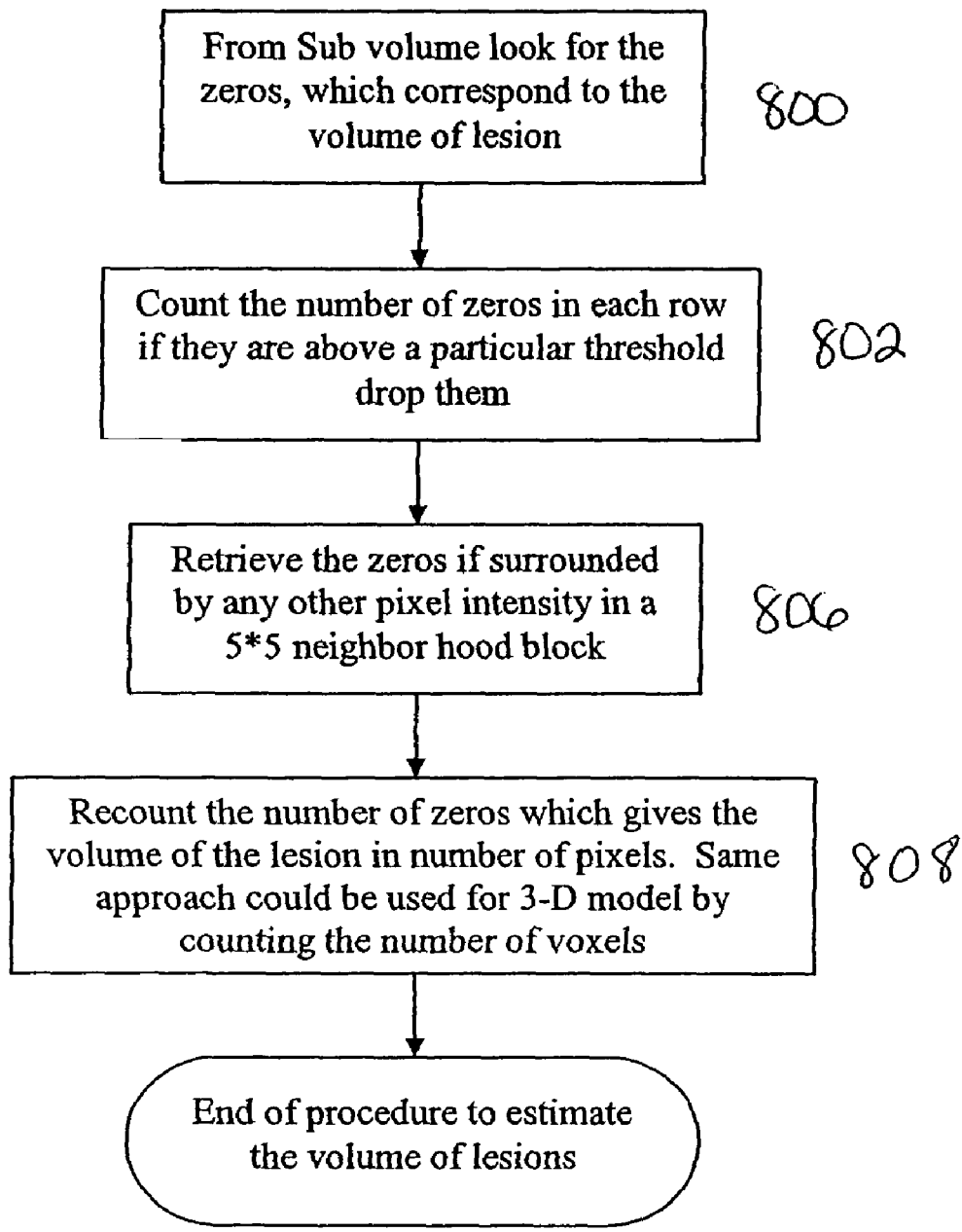
FIG. 24 is flow chart sub-volume calculation steps.

The routine for estimating lesion volume from a subvolume is illustrated in FIG. 24. From a subvolume display, each row of pixels, column by column, is scanned by the processor for zero values. Zero values correspond to either open areas outside the solid 3-D model but within the selected cube for volumetric display, or they will represent the space within the lesion. Since only the latter is of interest, the former must be eliminated. In order to do so, at step 802 the processor will count the number of zeros in a row. A preconfigured threshold number of zeros establishes a value above which the row must correspond to a space outside the 3-D model and below which the number of zero value pixels in row may correspond to a lesion volume within the 3-D model space. The threshold may be arbitrarily set or, alternatively, may be set in a fashion corresponding the magnification of the subvolume. That is, multiple thresholds are stored in long term memory of the device, each corresponding to a volume size selected for display. A further alternative, a user may select the threshold. Zeros below the threshold are retrieved at step 804 when the row in which they reside is bounded by a pixel having a non-zero intensity. The boundary is considered to be anywhere within a five by five pixel neighborhood block around the pixels currently being analyzed.

After a number of zero value pixels are understood to correspond to a lesion and not the volume outside the 3-D model, they are isolated. That group of zero value pixels is recounted and summed to give a total volume of the lesion. As indicated in step 806, the same process may be used voxel by voxel.

Figure 25:
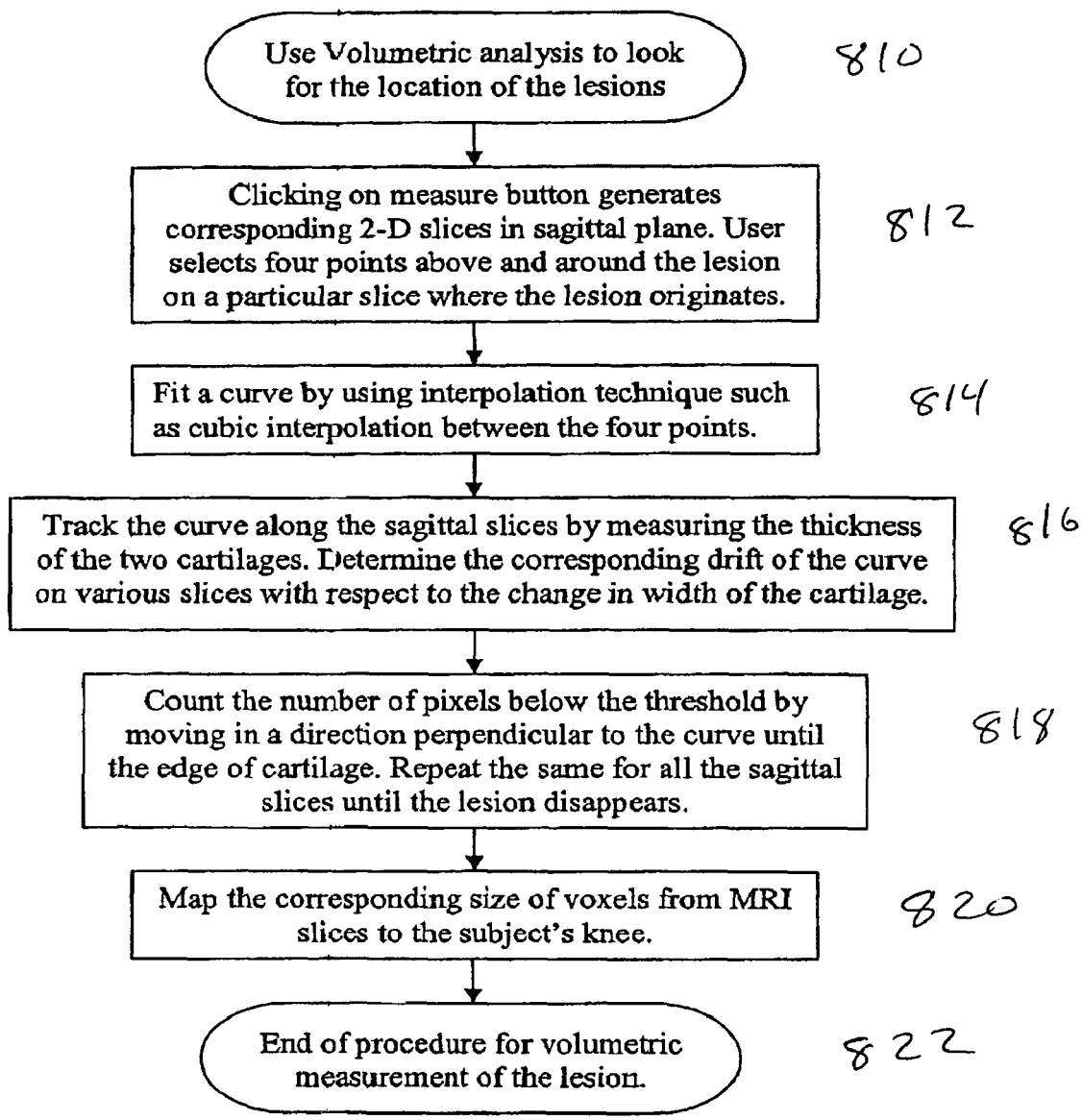
FIG. 25 is a flow chart for volumetric estimation.

FIG. 25 is a flow chart for volumetric estimation. At step 810, volumetric analysis is used to look for the location of the lesions. At step 812, 2-D slices in sagittal plane corresponding to a selected volume portion are chosen by the user. At step 814, the user selects four points above and around the lesion on a particular slice where the lesion originates. At step 816, a curve is tracked along the sagittal slices by measuring the thickness of the two cartilages and determining the corresponding drift of the curve on various slices with respect to the change in width of the cartilage. At step 818, the number of pixels below a threshold is counted by moving in a direction perpendicular to the curve until the edge of a cartilage is determined. This is repeated for all the sagittal slices until the lesion disappears. At step 820, the corresponding size of voxels from MRI slices of the subject's knee are mapped in. Step 822 is the end of procedure for volumetric measurement of the lesion.

Alternate display options which may be incorporated in any of the displays depicted throughout the figures include a field display in the current value of a pixel over which the cursor is located.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An anatomy display method comprising:
    obtaining an anatomy dataset comprised of pixels, each of said pixels having a luminance, said pixels being arranged in slices;
    selecting a portion of said anatomy dataset;
    choosing at least one slice of said portion of said anatomy dataset;
    establishing a threshold luminance within said portion of said anatomical dataset;
    zeroing all pixels below said threshold in said selected portion of said anatomy dataset;
    isolating a selected organ; and
    saving a volumetric matrix of said pixels corresponding to said selected organ;
    measuring a lesion volume and a negative width and length;
    wherein step of measuring lesion volume is comprised of:
        scanning each of a plurality of rows of pixels in turn;
        identifying consecutive zero values in each of said rows having zero values;
        deleting said rows of pixels for which a summed number of pixels having a zero value in excess of said threshold;
    rescanning the rows of pixels remaining after said step of deleting; and
    summing the number of pixels having zero values remaining.

2. The method of claim 1 further comprising converting said sum of pixels having zero values to a unit of volume measure.

3. A medical imaging apparatus embodied in a computer comprising:
    a processor;
    a network interface adapted to receive a medical imaging dataset;
    a graphical user interface having a cursor and slice identification fields for selecting a portion of said medical imaging dataset from a display, said selected portion being available for further processing;
    said processor being configured to process said selected portion of said medical imaging dataset, said processing comprising:
        selecting at least one representative slice;
        establishing a threshold luminance;
        zeroing all pixels having a luminance below said threshold luminance;
        isolating a selected organ by erasing all but a largest volumes of continuous pixels not zeroed; and
    a memory for saving a processed matrix of pixels corresponding to said selected organ;
    said processor being further configured to
    scan each of a plurality of rows of pixels in turn;
    identify consecutive zero values in each of said rows having zero values;
    delete those rows of pixels for which said summed number of pixels having a zero value in excess of a threshold;
    rescan the rows of pixels remaining after said step of deleting; and
    sum the number of pixels having zero values remaining, said processor being further configured to:
    scan each of a plurality of rows of pixels in turn;
    indentify consecutive zero values in each of said rows of pixels having zero values;
    delete said rows of pixels for which said summed number of pixels having said zero value in excess of a threshold;
    rescan the rows of pixels remaining after said step of deleting; and sum the number of pixels having zero values remaining.

4. An anatomy display method comprising:
    obtaining an anatomy dataset comprised of pixels, each of said pixels, said pixels being arranged in slices;
    choosing at least one slice of said portion of said anatomy dataset;
    establishing a threshold luminance within said portion of said anatomical dataset;
    zeroing all pixels below said threshold in said selected portion of said anatomy dataset;
    saving a volumetric matrix of said pixels corresponding to said selected organ;
    isolating an organ of interest within a user selected volume;
    summing a total of pixels or voxels representing said organ tissue having a luminance value or a chrominance value above a threshold value;
    removing from a display of said user selected volume all but a largest volume body of tissue above said threshold for organ of interest; and
    said largest volume of body tissue is a volume having a continuous surface.

* * * * *

UNITED STATES PATENT AND TRADEMARK OFFICE
CERTIFICATE OF CORRECTION

PATENT NO. : 8,041,087 B2  
APPLICATION NO. : 11/099406  
DATED : October 18, 2011  
INVENTOR(S) : Thomas L. Stewart and Deepak K. Gaddipati Page 1 of 1

It is certified that error appears in the above-identified patent and that said Letters Patent is hereby corrected as shown below:

Col. 11, Claim 1, line 57 insert "a" instead of "said"; Claim 1, line 57 should read: "of pixels having a zero value in excess of a thresh-"

Col. 12, Claim 3, line 21, "volumes" should be "volume"

Col. 12, Claim 3, line 31 delete the "and"; Claim 3, line 31 should read: "ing;"

Col. 12, Claim 4, line 43-44, delete the words "each of said pixels,"; Claim 4, lines 43-44 should read: "obtaining an anatomy dataset comprised of pixels, said pixels being arranged in slices;"

Col. 12, Claim 4, line 59, insert --the-- between "for" and "organ"; Claim 4, line 59 should read: "for the organ of interest; and"

Signed and Sealed this  
Twenty-fifth Day of September, 2012

David J. Kappos  
*Director of the United States Patent and Trademark Office*